US012260122B2

United States Patent
Lee et al.

(10) Patent No.: US 12,260,122 B2
(45) Date of Patent: Mar. 25, 2025

(54) STORAGE CONTROLLER PROVIDING STATUS INFORMATION OF ZONE REGION, METHOD OF OPERATING THE SAME, AND METHOD OF OPERATING ELECTRONIC DEVICE HAVING THE SAME

(71) Applicant: Samsung Electronics Co., Ltd., Suwon-si (KR)

(72) Inventors: Minkyeong Lee, Suwon-si (KR); Jaesub Kim, Suwon-si (KR); Junho Kim, Suwon-si (KR); Yangwoo Roh, Suwon-si (KR); Youkun Shin, Suwon-si (KR); Donghee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 18/369,524

(22) Filed: Sep. 18, 2023

(65) Prior Publication Data
US 2024/0319918 A1   Sep. 26, 2024

(30) Foreign Application Priority Data
Mar. 23, 2023   (KR) .................. 10-2023-0038164

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0613; G06F 3/0655; G06F 3/0608; G06F 3/064; G06F 3/0688; G06F 12/10; G06F 12/1009
See application file for complete search history.

(56) References Cited

U.S. PATENT DOCUMENTS

| | | | |
|---|---|---|---|
| 11,340,987 B1 | 5/2022 | Gole et al. | |
| 11,386,005 B2 | 7/2022 | Ha | |
| 2020/0089407 A1 | 3/2020 | Baca et al. | |
| 2020/0356307 A1* | 11/2020 | Subbarao | G11C 16/10 |
| 2021/0157720 A1* | 5/2021 | Bert | G06F 3/0608 |
| 2021/0182166 A1* | 6/2021 | Hahn | G06F 11/3034 |
| 2021/0334215 A1 | 10/2021 | Gole et al. | |
| 2022/0050626 A1 | 2/2022 | Oh et al. | |
| 2022/0137817 A1 | 5/2022 | Kwak et al. | |
| 2022/0156000 A1 | 5/2022 | Inbar et al. | |

(Continued)

*Primary Examiner* — Tracy C Chan
(74) *Attorney, Agent, or Firm* — Sughrue Mion, PLLC

(57) ABSTRACT

A method of operating a storage controller which communicates with a host device and a non-volatile memory device is provided. The method includes: receiving a first command from the host device indicating a read operation of first status information of a first zone random write area (ZRWA) in a first zone region, wherein the first command complies with a zoned namespace (ZNS) standard; obtaining the first status information from a zone status table in the storage controller based on the first command, wherein the first status information indicates at least a portion of a first physical region of the non-volatile memory device corresponding to the first ZRWA in which first data are stored; and providing the first status information to the host device.

20 Claims, 15 Drawing Sheets

(56) References Cited

U.S. PATENT DOCUMENTS

| | | |
|---|---|---|
| 2022/0179794 A1 | 6/2022 | Kanteti |
| 2022/0283900 A1* | 9/2022 | Gole et al. |
| 2022/0292031 A1* | 9/2022 | Gole .................. G06F 12/1009 |
| 2023/0075329 A1* | 3/2023 | Surianarayanan .... G06F 3/0653 |
| 2023/0161500 A1* | 5/2023 | Doucette ............... G06F 3/0688 |
| | | 711/5 |
| 2023/0418494 A1* | 12/2023 | Bert ...................... G06F 3/0604 |

* cited by examiner

STORAGE CONTROLLER PROVIDING STATUS INFORMATION OF ZONE REGION, METHOD OF OPERATING THE SAME, AND METHOD OF OPERATING ELECTRONIC DEVICE HAVING THE SAME

CROSS-REFERENCE TO RELATED APPLICATION

This application claims priority to Korean Patent Application No. 10-2023-0038164 filed on Mar. 23, 2023, in the Korean Intellectual Property Office, the disclosure of which is incorporated by reference herein in its entirety.

BACKGROUND

The present disclosure relates to management of a zone region, and more particularly, to a storage controller providing status information of a zone region, a method of operating the storage controller, and a method of operating an electronic device including the storage controller.

A memory device may store data in response to a write request and may output data stored therein in response to a read request. For example, the memory device may be classified as a volatile memory device, which loses data stored therein when a power is turned off, such as a dynamic random access memory (DRAM) device or a static RAM (SRAM) device, or a non-volatile memory device, which retains data stored therein even when a power is turned off, such as a flash memory device, a phase-change RAM (PRAM), a magnetic RAM (MRAM), or a resistive RAM (RRAM).

The non-volatile memory device may store data depending on a random access. The random access results in frequent garbage collection, thereby causing a decrease in the lifetime of the storage device. To reduce garbage collection operations and extend lifetime of the storage device, memory blocks of the non-volatile memory device may be partitioned into zone regions and related data may be sequentially stored within the zone regions. A random write operation may be exceptionally required in the zone region depending on a request or an operating policy of a host device.

SUMMARY

Example embodiments provide a storage controller which provides status information of a zone region, a method of operating the storage controller, and a method of operating an electronic device including the storage controller.

According to an aspect of an embodiment, a method of operating a storage controller which communicates with a host device and a non-volatile memory device is provided. The method includes: receiving a first command from the host device indicating a read operation of first status information of a first zone random write area (ZRWA) in a first zone region, wherein the first command complies with a zoned namespace (ZNS) standard; obtaining the first status information from a zone status table in the storage controller based on the first command, wherein the first status information indicates at least a portion of a first physical region of the non-volatile memory device corresponding to the first ZRWA in which first data are stored; and providing the first status information to the host device.

According to an aspect of an embodiment, a method of operating an electronic device which includes a host device, a storage controller, and a non-volatile memory device is provided. The method includes: providing, by the host device, a first command to the storage controller, wherein the first command indicates a read operation of status information of a ZRWA in a target zone region, and complies with a ZNS standard; obtaining, by the storage controller, the status information from a zone status table in the storage controller based on the first command, wherein the status information indicates at least a portion of a physical region of the non-volatile memory device corresponding to the ZRWA in which data are stored; and providing, by the storage controller, the status information to the host device.

According to an aspect of an embodiment, a storage controller includes: at least one processor configured to control: a zone manager to manage a plurality of zone regions in a non-volatile memory device; status information of a target zone region among the plurality of zone regions to be stored in a zone status table; and a command manager to: receive a first command from a host device indicating a read operation of status information of a ZRWA in the target zone region, wherein the first command complies with a ZNS standard; obtain the status information from the zone status table by controlling the zone manager based on the first command; and provide the status information to the host device. The status information indicates a portion of a physical region of the non-volatile memory device corresponding to the ZRWA in which data are stored.

BRIEF DESCRIPTION OF DRAWINGS

The above and other aspects and features will more clearly understood from the following description of example embodiments, taken in conjunction with the accompanying drawings, in which.

DETAILED DESCRIPTION

Below, example embodiments will be described with reference to the accompanying drawings.

Figure 1:
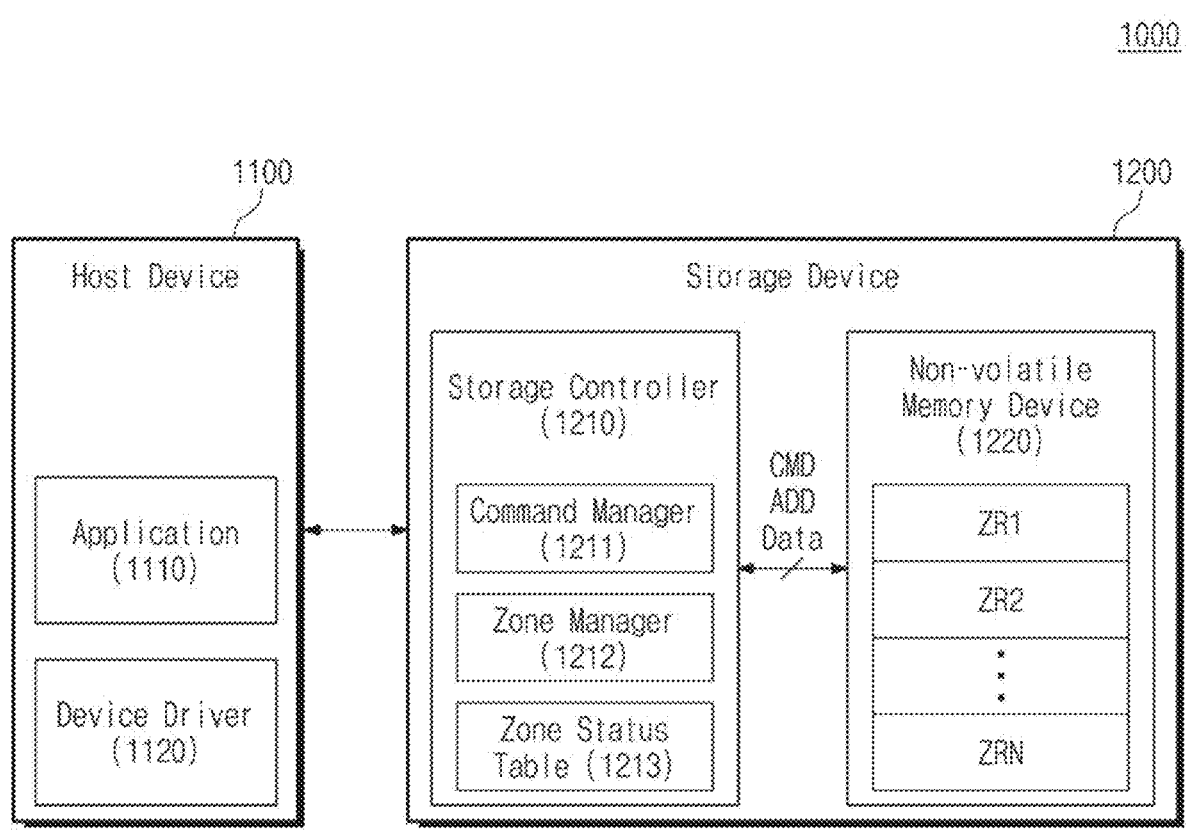
FIG. 1 is a block diagram of an electronic device according to an example embodiment.

FIG. 1 is a block diagram of an electronic device according to an example embodiment. Referring to FIG. 1, an electronic device 1000 may include a host device 1100 and a storage device 1200. The electronic device 1000 may be a computing system, which is configured to process a variety of information, such as a personal computer (PC), a notebook, a laptop, a server, a workstation, a tablet PC, a smartphone, a digital camera, and a black box.

The host device 1100 may control an overall operation of the electronic device 1000. The host device 1100 may include an application 1110 and a device driver 1120. The application 1110 may provide a system request to the device driver 1120 under control of the user. The system request may indicate data management for file creation, change, and deletion. Under control of the application 1110, the device driver 1120 may store data in the storage device 1200 or may read data stored in the storage device 1200. The device driver 1120 may support a zoned namespace (ZNS) standard consistent with Non-Volatile Memory express (NVMe).

The ZNS standard may be a protocol which supports a sequential write in a zone region. In general, a non-volatile memory device may store data depending on a random access. For example, data corresponding to sequential logical block addresses LBAs may be stored in memory cells or memory blocks that are not physically sequential. The random access results in frequent garbage collection, thereby causing a decrease in the lifetime of the storage device 1200. To reduce garbage collection operations and extend lifetime of the storage device, memory blocks of the non-volatile memory device may be partitioned into zone regions, and data may be sequentially stored in the zone regions. The expression "to sequentially store data" may mean to sequentially store data corresponding to the sequential LBAs at physically adjacent physical block addresses PBAs.

A random write operation may be exceptionally required in a zone region depending on a request or an operating policy of the host device 1100. The random write operation may mean to store data without maintaining logical sequentiality and physical sequentiality in a zone region. For example, if a storage device supports only the sequential write, there may be a limitation (i.e., an append-only attribute) that previously stored data are incapable of being changed. When an in-place update is needed, such as a metadata update, the sequential write may be inefficient in data management. As such, the random write operation may be required within a given period.

The ZNS standard may support a zone random write area (ZRWA) and an implicit ZRWA flush region (IZFR) where an exceptional random write in a zone region is permitted. The ZRWA is an area positioned after a write pointer and may be an area where a non-sequential (i.e., random) write is possible. Even though the random write occurs within the ZRWA, the write pointer may not be updated. The IZFR is a region positioned after the ZRWA and may have the same size as the ZRWA. When the random write occurs within the IZFR, the write pointer may be automatically updated.

The storage device 1200 may store data under control of the host device 1100. The storage device 1200 may support the ZNS standard of the NVMe. For example, the storage device 1200 may allocate corresponding physical blocks (e.g., actual physical memory blocks in a non-volatile memory device 1220) to a zone region depending on a request of the host device 1100. In the zone region, data corresponding to sequential LBAs may be stored on physically sequential blocks. The zone region may conceptually refer to the sequential LBAs that the host device 1100 refers to, and the sequential LBAs that correspond to physically sequential blocks in the storage device 1200. The ZNS standard will be described in detail with reference to FIGS. 4, 5, and 6.

The storage device 1200 may include a storage controller 1210 and the non-volatile memory device 1220. Under control of the host device 1100 or depending on an internal policy, the storage controller 1210 may store data in the non-volatile memory device 1220 or may read data stored in the non-volatile memory device 1220. For example, based on a command CMD indicating an operation to be performed and an address ADD indicating a location of data, the storage controller 1210 may store data in the non-volatile memory device 1220 or may read data stored in the non-volatile memory device 1220.

The storage controller 1210 may include a command manager 1211, a zone manager 1212, and a zone status table 1213. In response to a command received from the host device 1100, the command manager 1211 may perform an operation corresponding to the command or may control the zone manager 1212 and the zone status table 1213.

The zone manager 1212 may manage first to N-th zone regions ZR1 to ZRN of the non-volatile memory device 1220. Herein, "N" is an arbitrary natural number. The first to N-th zone regions ZR1 to ZRN may be also referred to as a "plurality of zone regions". For example, under control of the command manager 1211, the zone manager 1212 may allocate physical blocks of the non-volatile memory device 1220 to an arbitrary zone region. The zone manager 1212 may manage the zone status of the allocated zone region.

The zone status table 1213 may manage status information of the first to N-th zone regions ZR1 to ZRN. The status information may indicate information about the ZRWA of the zone region. For example, the status information may include index information of a zone region, range information of the ZRWA, and address information corresponding to a physical region of the ZRWA, in which data are written.

The non-volatile memory device 1220 may store data under control of the storage controller 1210. The non-volatile memory device 1220 may include the first to N-th zone regions ZR1 to ZRN. Each of the first to N-th zone regions ZR1 to ZRN may correspond to a set of physically sequential blocks and may support the sequential write operation; and each of the first to N-th zone regions ZR1 to ZRN may support the random write operation in the ZRWA and IZFR.

In some example embodiments, the non-volatile memory device 1220 may be a NAND flash memory device, but example embodiments are not limited thereto. For example, the non-volatile memory device 1220 may be one of various storage devices, which retain data stored therein even though a power is turned off, such as a phase-change random access memory (PRAM), a magnetic random access memory (MRAM), a resistive random access memory (RRAM), and a ferroelectric random access memory (FRAM).

Figure 2:
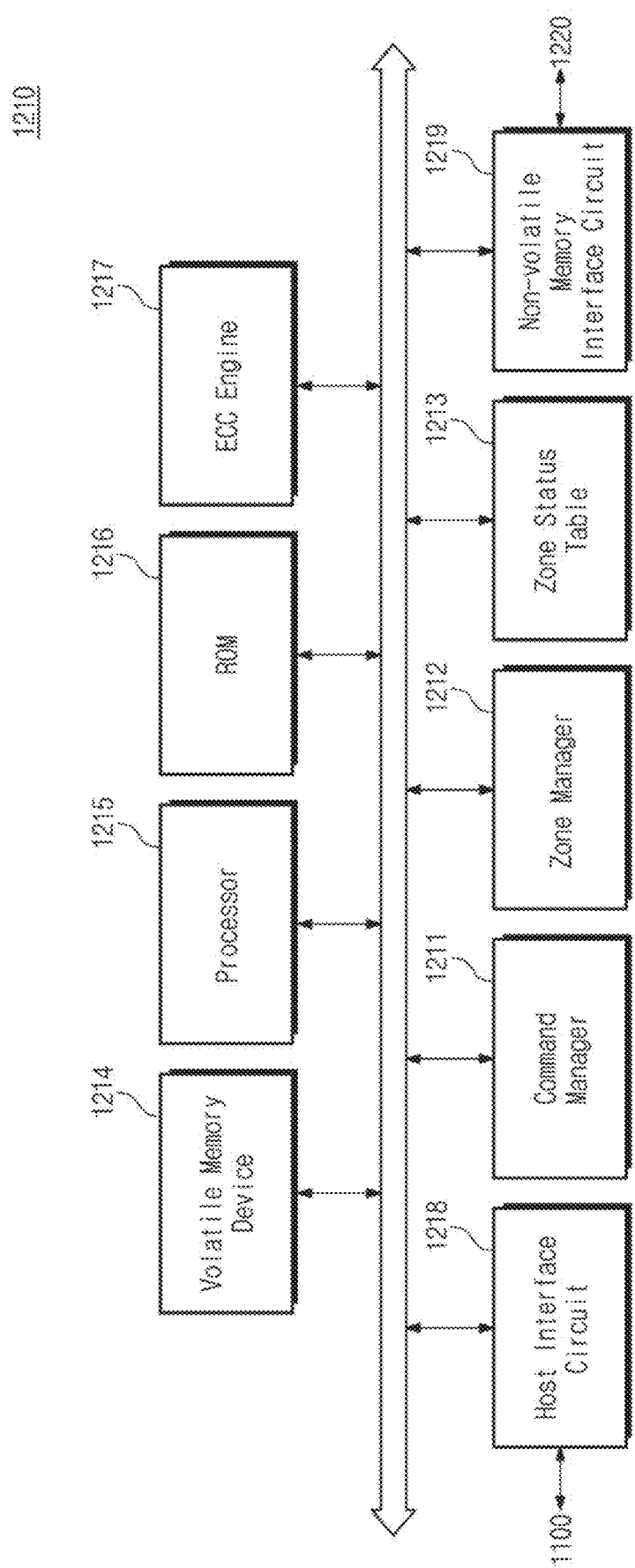
FIG. 2 is a block diagram illustrating a storage controller of FIG. 1 in detail, according to some example embodiments.

FIG. 2 is a block diagram illustrating a storage controller of FIG. 1 in detail, according to some example embodiments. Referring to FIGS. 1 and 2, the storage controller 1210 may communicate with the host device 1100 and the non-volatile memory device 1220.

The storage controller 1210 may include the command manager 1211, the zone manager 1212, the zone status table 1213, a volatile memory device 1214, a processor 1215, a read only memory (ROM) 1216, an error correcting code (ECC) engine 1217, a host interface circuit 1218, and a non-volatile memory interface circuit 1219.

The command manager 1211, the zone manager 1212, and the zone status table 1213 are similar to the command manager 1211, the zone manager 1212, and the zone status table 1213 of FIG. 1, and thus, additional description will be omitted to avoid redundancy.

In some example embodiments, the command manager 1211, the zone manager 1212, and the zone status table 1213 may be implemented with a firmware. For example, the non-volatile memory device 1220 may store instructions corresponding to a module implemented with firmware. The processor 1215 (i.e., a hardware processor) may load the instructions of the non-volatile memory device 1220 to the volatile memory device 1214. The processor 1215 may execute the loaded instructions to allow the storage device 1200 to perform functions of the module.

The volatile memory device 1214 may be used as a main memory, a cache memory, or a working memory of the storage controller 1210. In some example embodiments, the volatile memory device 1214 may be implemented with a static random access memory (SRAM), a dynamic random access memory (DRAM), etc.

The processor 1215 may control an overall operation of the storage controller 1210. The ROM 1216 may be used as a read only memory that stores information necessary for the operation of the storage controller 1210. The ECC engine 1217 may detect and correct an error of data read from the non-volatile memory device 1220. For example, the ECC engine 1217 may have an error correction capability of a given level. The ECC engine 1217 may correct an error of data having an error level (e.g., the number of flipped bits) not exceeding the error correction capability and may process data having an error level exceeding the error correction capability as uncorrectable data.

The storage controller 1210 may communicate with the host device 1100 through the host interface circuit 1218. In some example embodiments, the host interface circuit 1218 may be implemented based on at least one of various interfaces such as a serial ATA (SATA) interface, a peripheral component interconnect express (PCIe) interface, a serial attached SCSI (SAS), a non-volatile memory express (NVMe) interface, and a universal flash storage (UFS) interface. Also, the host interface circuit 1218 may support the ZNS standard of the NVMe.

The storage controller 1210 may communicate with the non-volatile memory device 1220 through the non-volatile memory interface circuit 1219. In some example embodiments, the non-volatile memory interface circuit 1219 may be implemented based on the NAND interface. Also, the non-volatile memory interface circuit 1219 may support the ZNS standard of the NVMe.

Figure 3:
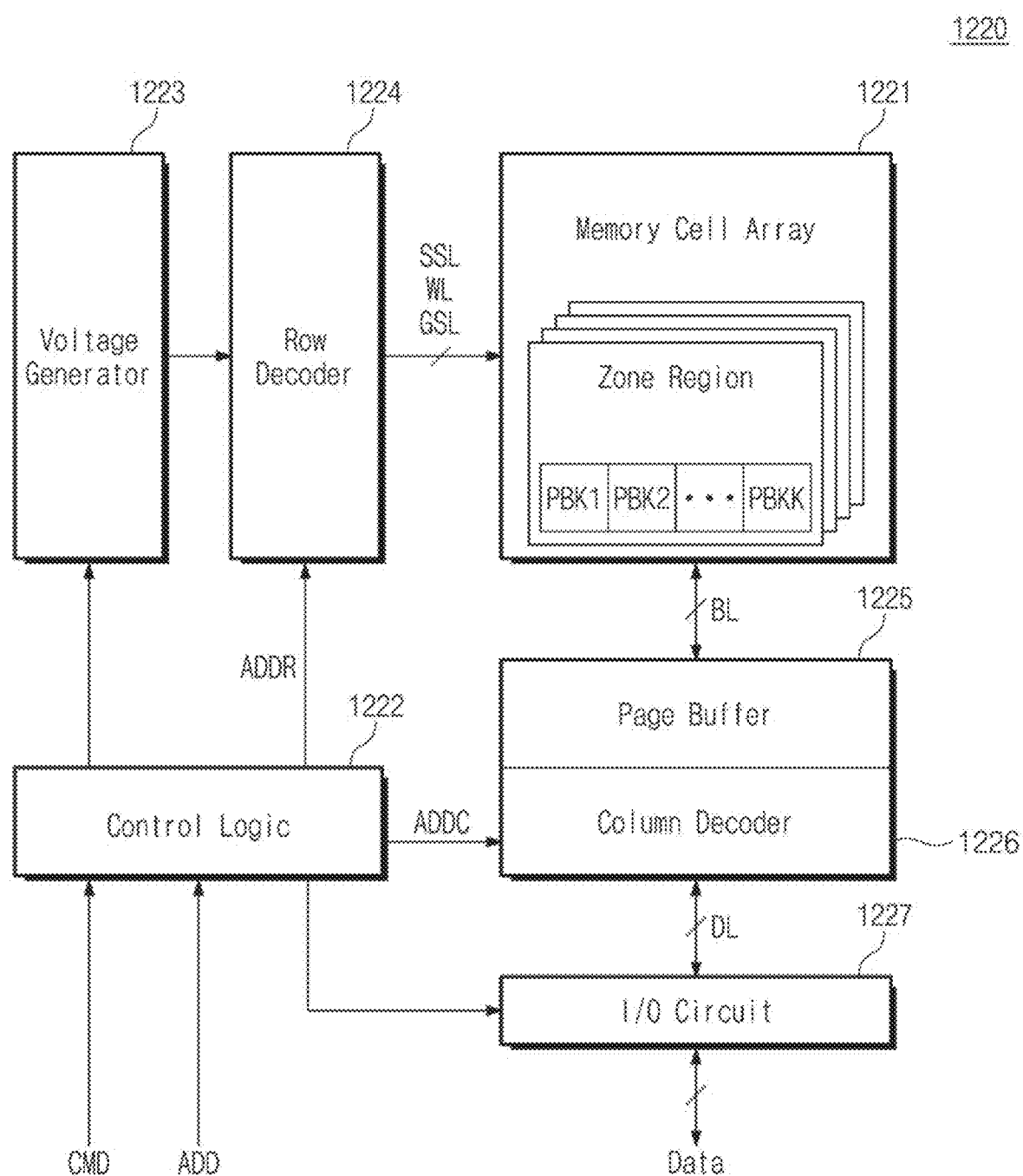
FIG. 3 is a block diagram illustrating a non-volatile memory device of FIG. 1 in detail, according to some example embodiments.

FIG. 3 is a block diagram illustrating a non-volatile memory device of FIG. 1 in detail, according to some example embodiments. Referring to FIGS. 1 and 3, the non-volatile memory device 1220 may communicate with the storage controller 1210. For example, the non-volatile memory device 1220 may receive the address ADD and the command CMD from the storage controller 1210. The non-volatile memory device 1220 may communicate data with the storage controller 1210.

The non-volatile memory device 1220 may include a memory cell array 1221, control logic 1222, a voltage generator 1223, a row decoder 1224, a page buffer 1225, a column decoder 1226, and an input/output (I/O) circuit 1227.

The memory cell array 1221 may include a plurality of memory cells arranged in a row direction and a column direction. The plurality of memory cells may constitute a physical region capable of storing data. The plurality of memory cells may be divided into a "plurality of zone regions". For example, the zone manager 1212 may allocate a plurality of physical blocks PBK1 to PBKK to a zone region. Herein, "K" is an arbitrary natural number. The plurality of physical blocks PBK1 to PBKK may correspond to a set of physically adjacent memory cells.

The control logic 1222 may receive the command CMD and the address ADD from the storage controller 1210. The command CMD may refer to a signal indicating an operation to be performed by the non-volatile memory device 1220, such as a read operation, a write operation, or an erase operation. The address ADD may include a row address ADDR and a column address ADDC. The control logic 1222 may control an overall operation of the non-volatile memory device 1220 based on the command CMD and the address ADD. The control logic 1222 may generate the row address ADDR and the column address ADDC based on the address ADD.

Under control of the control logic 1222, the voltage generator 1223 may control voltages to be applied to the memory cell array 1221 through the row decoder 1224.

The row decoder 1224 may receive the row address ADDR from the control logic 1222. The row decoder 1224 may be connected to the memory cell array 1221 through string selection lines SSL, word lines WL, and ground selection lines GSL. The row decoder 1224 may decode the row address ADDR and may control voltages to be applied to the string selection lines SSL, the word lines WL, and the ground selection lines GSL based on a decoding result and voltages received from the voltage generator 1223.

Depending on the voltages applied from the row decoder 1224, the memory cell array 1221 may operate to store data or to output the stored data.

The page buffer 1225 may include a plurality of page buffers. The plurality of page buffers may be connected to the memory cell array 1221 through bit lines BL. The page buffer 1225 may read data from the memory cell array 1221 in units of a page, by sensing voltages of the bit lines BL.

The column decoder 1226 may receive the column address ADDC from the control logic 1222. The column decoder 1226 may decode the column address ADDC and may provide the data read by the page buffer 1225 to the I/O circuit 1227 based on a decoding result.

The column decoder 1226 may receive data from the I/O circuit 1227 through data lines DL. The column decoder 1226 may receive the column address ADDC from the control logic 1222. The column decoder 1226 may decode the column address ADDC and may provide the data received from the I/O circuit 1227 to the page buffer 1225 based on a decoding result. The page buffer 1225 may store the data provided from the I/O circuit 1227 in the memory cell array 1221 through the bit lines BL in units of a page.

The I/O circuit 1227 may be connected to the column decoder 1226 through the data lines DL. The I/O circuit 1227 may provide data received from the storage controller 1210 to the column decoder 1226 through the data lines DL. The I/O circuit 1227 may provide data received through the data lines DL to the storage controller 1210.

Figure 4:
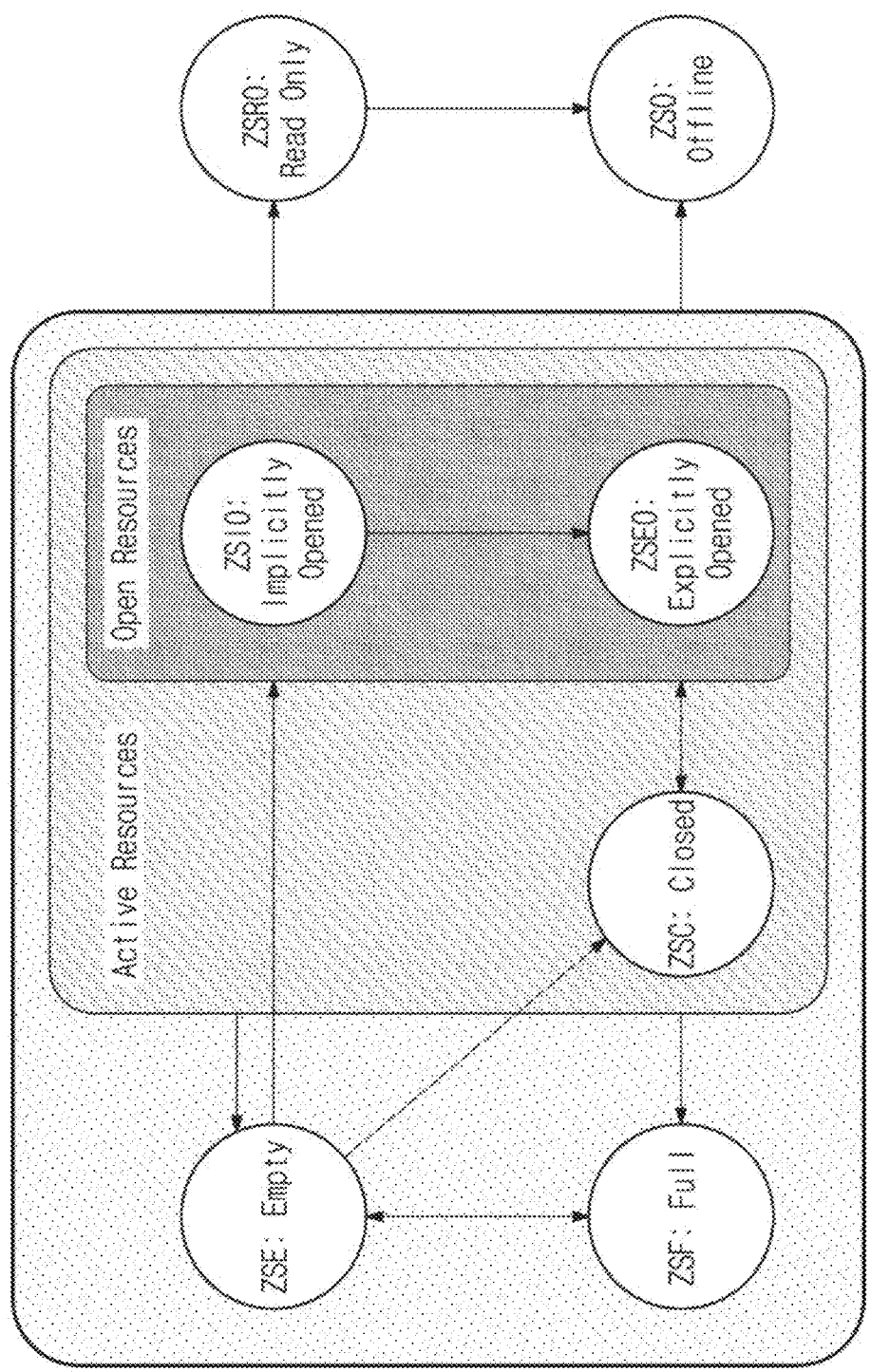
FIG. 4 is a diagram describing states of a zone region according to some example embodiments.

FIG. 4 is a diagram describing states of a zone region according to some example embodiments. States that each of the first to N-th zone regions ZR1 to ZRN is capable of having will be described with reference to FIGS. 1 and 4.

According to some example embodiments, zone regions managed by the storage device 1200 may have one of a ZSE state, a ZSIO state, a ZSEO state, a ZSC state, a ZSF state, a ZSRO state, and a ZSO state. As the storage device 1200 processes a request received from the host device 1100, a state of a zone region may transition from one state to another state.

The ZSE state, the ZSF state, the ZSRO state, and the ZSO state may each be classified as a non-active state. The ZSIO state, the ZSEO state, and the ZSC state may each be classified as an active state. Zone regions of the active state may be limited by a maximum active resources field. The ZSIO state and the ZSEO state may be classified as an open state. Zone regions of the open state may be limited by a maximum open resources field.

The ZSE state may indicate an empty state. In the ZSE state, physical memory blocks may not yet store data, and the write pointer may point out the lowest logical block address (e.g., an LBA having the smallest number from among logical block addresses corresponding to a zone region). The write pointer of the ZSE state may be valid. The ZSE state may transition to one of the ZSIO state, the ZSEO state, the ZSC state, and the ZSF state.

The ZSIO state may indicate an implicitly opened state. The ZSIO state may be a state implicitly opened by executing a write command received from the host device 1100. In the ZSIO state, a physical memory block may store data corresponding to the write command. The ZSIO state may transition to one of the ZSE state, the ZSEO state, the ZSC state, and the ZSF state. When an open resource is saturated, the ZSIO state may transition to the ZSC state even though there is no close command.

The ZSEO state may indicate an explicitly opened state. The ZSEO state may be a state explicitly opened by executing an open command received from the host device 1100. In the ZSEO state, a physical memory block may receive a write command subsequent to the open command, and may then store data corresponding to the write command The ZSEO state may transition to one of the ZSE state, the ZSC state, and the ZSF state. The ZSEO state may have a higher priority to an open resource than the ZSIO state. The ZSEO may transition to the ZSC only by execution of the close command.

The ZSC state may indicate a closed state. The transition to the ZSC state may be made 1) when, in the ZSE state, usable active resources are present and a set zone descriptor extension command is received, 2) when, in the ZSIO state, the close command is received or an open resource is saturated, or 3) when, in the ZSEO state, the close command is received. In the ZSC state, a physical memory block may store data corresponding to a write command. The ZSC state may transition to one of the ZSE state, the ZSIO state, the ZSEO state, and the ZSF state.

The ZSF state may indicate a full state. In the ZSE state, physical memory blocks may be full (e.g., of the stored data), and the write pointer may point out the highest logical block address (e.g., an LBA having the greatest number from among logical block addresses corresponding to a zone region). The write pointer of the ZSF state may be invalid. The ZSF state may transition to the ZSE state by execution of a reset zone command.

The ZSRO state may indicate a read only state. The ZSRO state may be used for a space where the host device 1100 continues to use a zoned namespace after a portion of performance of a zone region stops an operation. The ZSRO state may transition to the ZSO state by execution of an offline zone command.

The ZSO state may indicate an offline state. The ZSO state may not have a valid write pointer, may not have active resources, and may not have open resources. The ZSO state may not have any other state capable of transitioning to.

In some example embodiments, the host device 1100 may provide the storage device 1200 with a command indicating the random write operation of the ZRWA belonging to a zone region having an active state (e.g., the ZSIO state, the ZSEO state, or the ZSC state). The storage device 1200 may perform the random write operation on a physical region corresponding to the ZRWA of the non-volatile memory device 1220 based on the command and may update the status information in the zone status table 1213.

Figure 5:
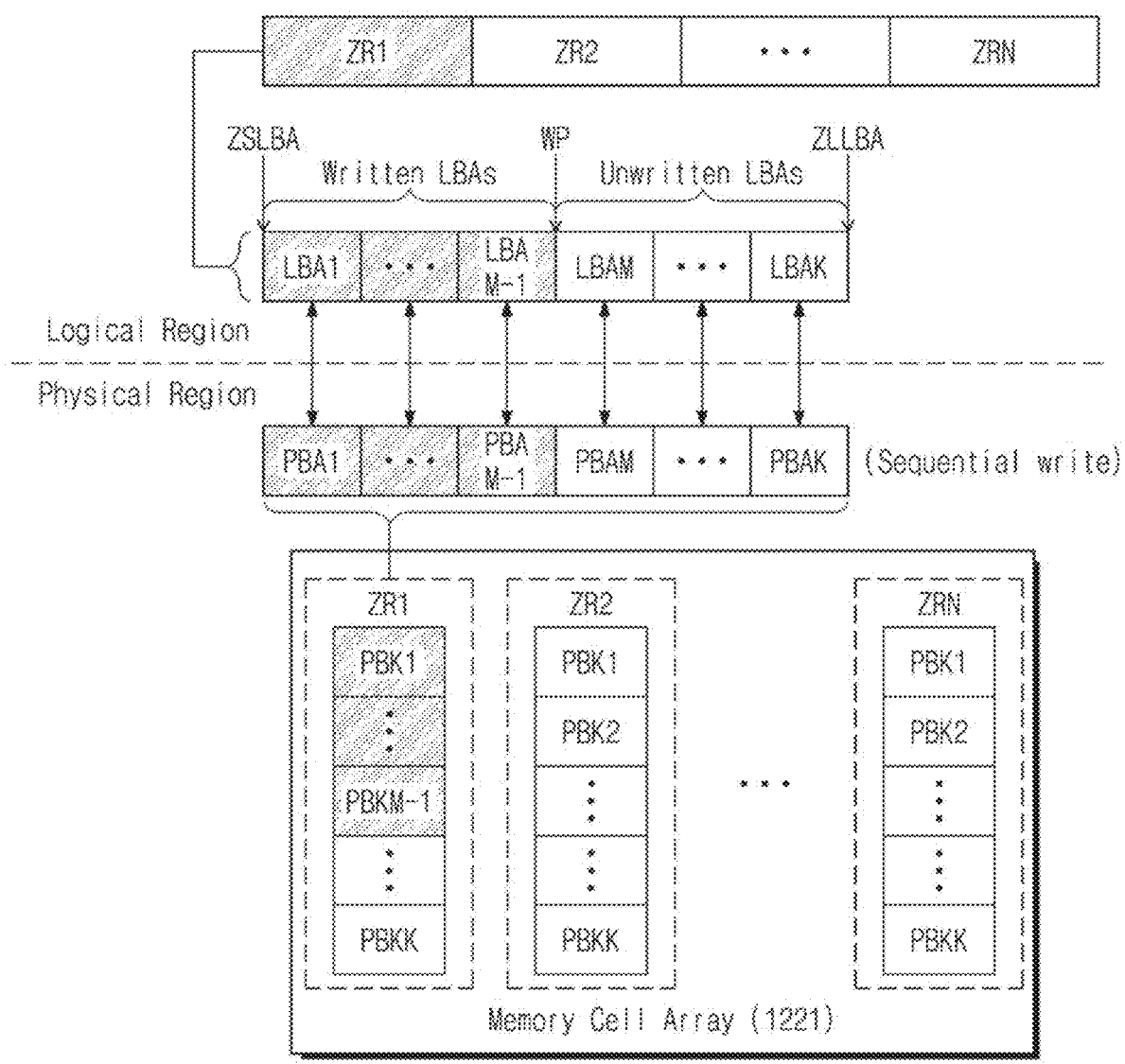
FIG. 5 is a diagram describing a sequential write of a zone region according to some example embodiments.

FIG. 5 is a diagram describing a sequential write of a zone region according to some example embodiments. Referring to FIGS. 1 and 5, the storage controller 1210 may perform the sequential write operation of data within the memory cell array 1221.

For better understanding, there are together illustrated a logical region and a physical region with regard to the first to N-th zone regions ZR1 to ZRN. The logical region may refer to addresses capable of being identified by the host device 1100. The physical region may refer to addresses corresponding to actual memory cells of the memory cell array 1221. The logical region and the physical region may have a mapping relationship.

Referring to the logical region, each of the first to N-th zone regions ZR1 to ZRN may include a plurality of LBAs. For example, the first zone region ZR1 may include first to K-th LBAs LBA1 to LBAK. The first to K-th LBAs LBA1 to LBAK may be logically sequential. The first zone region ZR1 may correspond to a range from a zone start LBA ZSLBA to a zone last LBA ZLLBA. The zone start LBA ZSLBA may be the first LBA LBA1. The zone last LBA ZLLBA may be an address corresponding to a result of adding the K-th LBA LBAK and a unit magnitude of the LBA. The zone last LBA ZLLBA may correspond to a zone start LBA of the second zone region ZR2.

The storage controller 1210 may perform the sequential write operation by using a write pointer WP. For example, in the first zone region ZR1, the first to (M−1)-th LBAs LBA1 to LBAM−1 may be LBAs (i.e., written LBAs) where data are stored. Herein, "M" is a natural number less than "K". In the first zone region ZR1, the M-th to K-th LBAs LBAM to LBAK may be LBAs (i.e., unwritten LBAs) where data are not yet stored. The write pointer WP may point out the M-th LBA LBAM. Data to be written afterwards may be stored in a physical region corresponding to the M-th LBA LBAM (e.g., in the M-th physical block PBKM); after the data are written, the write pointer WP may be updated to point out a next LBA (e.g., (M+1)-th LBA LBAM+1).

Referring to the physical region, the memory cell array 1221 may include a plurality of physical blocks corresponding to the first to N-th zone regions ZR1 to ZRN. For better understanding, an example in which each of the first to N-th zone regions ZR1 to ZRN includes the first to K-th physical blocks PBK1 to PBKK is illustrated, but the number of physical blocks that are allocated for each zone region may be differently determined.

The memory cell array 1221 may include the first to K-th physical blocks PBK1 to PBKK corresponding to the first zone region ZR1. The first to K-th physical blocks PBK1 to PBKK corresponding to the first zone region ZR1 may be physically sequential (e.g., memory cells of the first to K-th physical blocks PBK1 to PBKK may be disposed to be adjacent to each other). The first to K-th physical blocks PBK1 to PBKK may be respectively identified by first to K-th physical block addresses PBA1 to PBAK. The first to K-th physical block addresses PBA1 to PBAK may respectively correspond to the first to K-th LBAs LBA1 to LBAK in the logical region. The first to (M−1)-th physical blocks PBK1 to PBKM−1 may store data corresponding to the first to (M−1)-th LBAs LBA1 to LBAM−1. The M-th to K-th physical blocks PBKM to PBKK may not yet store data and may be used to store data in a subsequent write operation.

For better understanding, the description is given as one LBA corresponds to one PBA and one physical block, but example embodiments are not limited thereto. The LBAs may respectively correspond to sequential sub-blocks or sequential programming units in one physical block (e.g., a unit by which memory cells are programmed), while maintaining the logical sequentiality. The correspondence relationship of the LBA and the physical block may be variously changed and carried out by one skilled in the art.

As described above, according to an example embodiment, the storage device 1200 may support the ZNS standard and may store data such that the logical sequentiality and the physical sequentiality are guaranteed in the zone region. The random write operation may be exceptionally required in the zone region depending on a request or an operating policy of the host device 1100. The random write in the zone region will be described in detail with reference to FIG. 6.

Figure 6:
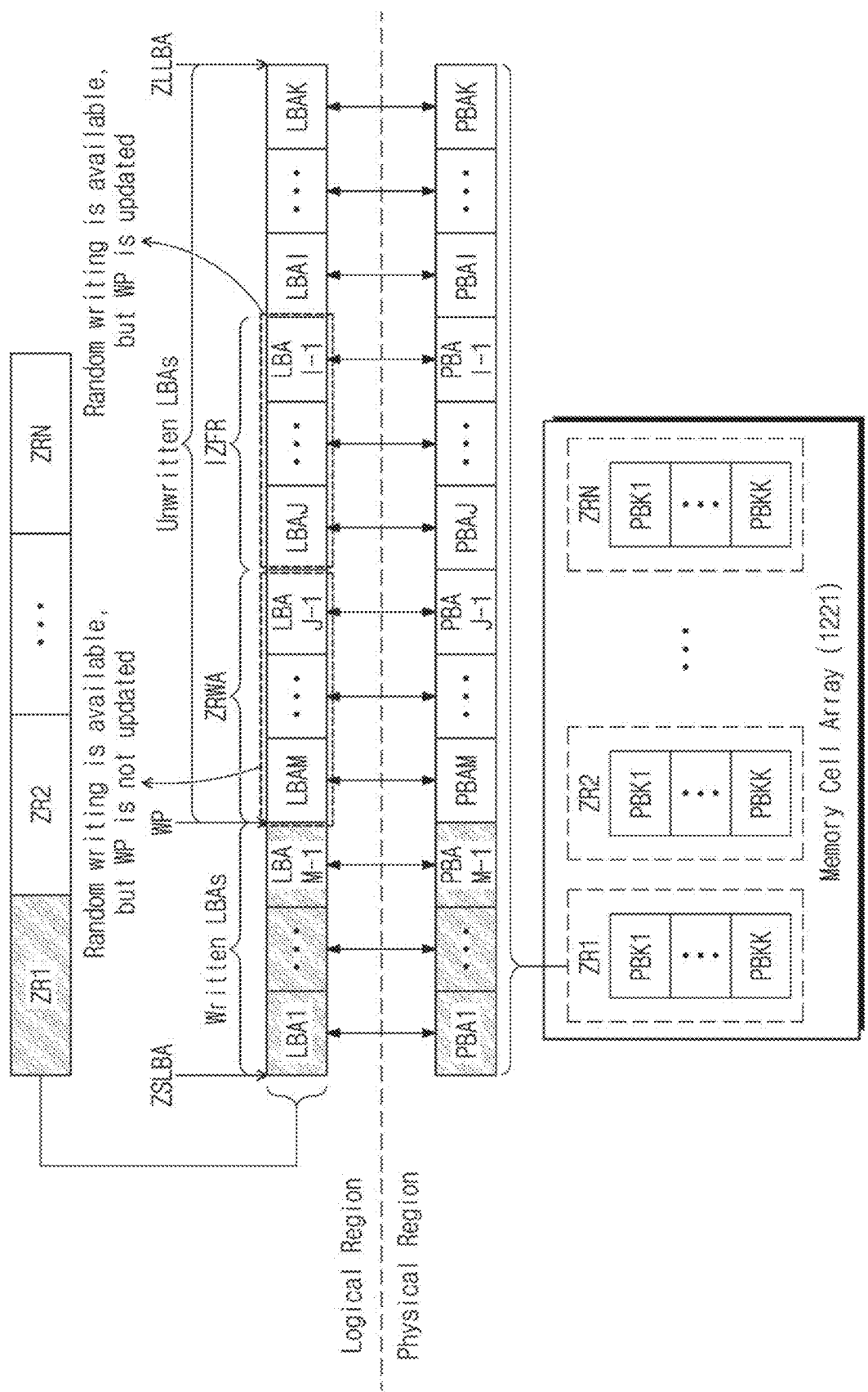
FIG. 6 is a diagram describing a random write of a zone region according to some example embodiments.

FIG. 6 is a diagram describing a random write of a zone region according to some example embodiments. Referring to FIGS. 1 and 6, the storage controller 1210 may perform the sequential write operation of data within the memory cell array 1221 and may perform the random write in the ZRWA and IZFR (i.e., portions of a zone region where the random write is exceptionally permitted). The logical region and the physical region may have a mapping relationship.

Referring to the logical region, each of the first to N-th zone regions ZR1 to ZRN may include a plurality of LBAs. For example, the first zone region ZR1 may include the first to K-th LBAs LBA1 to LBAK. The first zone region ZR1 may indicate a logical space between the zone start LBA ZSLBA to the zone last LBA ZLLBA.

In the first zone region ZR1, the first to (M−1)-th LBAs LBA1 to LBAM−1 may be LBAs (i.e., written LBAs) where data are stored or where data are incapable of being stored. For example, referring to the physical region, the first to (M−1)-th PBAs PBA1 to PBAM−1 may correspond to the first to (M−1)-th LBAs LBA1 to LBAM−1. The first to (M−1)-th physical blocks PBK1 to PBKM−1 having the first to (M−1)-th PBAs PBA1 to PBAM−1 may be used in the sequential write operation. Alternatively, the first to (M−1)-th physical blocks PBK1 to PBKM−1 having the first to (M−1)-th PBAs PBA1 to PBAM−1 may be blocks that are incapable of storing any other data as the write pointer WP is updated depending on the random write of the IZFR performed in the previous write operation.

The write pointer WP may point out an LBA immediately after the written LBAs (e.g., an LBA at which a subsequent sequential write operation starts or a first LBA of the ZRWA corresponding to the random write operation). The write pointer WP may point out the M-th LBA LBAM.

The M-th to (J−1)-th LBAs LBAM to LBAJ−1 may correspond to the ZRWA. Herein, "J" is a natural number greater than "M" and less than "K". The random write operation may be exceptionally permitted in the ZRWA. Even though the random write operation is performed within the ZRWA, the write pointer WP may not be updated. For example, before data are stored in a physical region corresponding to the M-th LBA LBAM (i.e., the M-th physical block PBKM having the M-th PBA PBAM), data may be stored in a physical region corresponding to the (J−1)-th LBA LBAJ−1 (i.e., the (J−1)-th physical block PBKJ−1 having the (J−1)-th PBA PBAJ−1). In this case, the write pointer WP may not be updated and may point out the M-th LBA LBAM.

The J-th to (I−1)-th LBAs LBAJ to LBAI−1 may correspond to the IZFR. Herein, "I" is a natural number greater than "J" and less than "K". The random write operation may be exceptionally permitted in the IZFR. The size (e.g., the number of LBAs) of the IZFR may be identical to the size of the ZRWA. When the random write operation is performed within the IZFR, the write pointer WP may be automatically updated. For example, before data are stored in a physical region corresponding to the J-th LBA LBAJ (i.e., the J-th physical block PBKJ having the J-th PBA PBAJ), data may be stored in a physical region corresponding to the (I−1)-th LBA LBAI−1 (i.e., the (I−1)-th physical block PBKI−1 having the (I−1)-th PBA PBAI−1). The write pointer WP may be updated to point out the I-th LBA LBAI.

As described above, according to an example embodiment, the storage device 1200 may support the ZNS standard and may exceptionally permit the random write operation in the ZRWA and IZFR of a zone region. When the random write operation is performed in the IZFR, the write pointer WP may be updated; in this case, the storage device 1200 may easily identify the written LBAs and may provide the updated write pointer WP to the host device 1100.

In contrast, when the random write operation is performed in the ZRWA, the write pointer WP may not be updated; in this case, it may be difficult to distinguish a physical region where data are actually written from a physical region where data are not yet written, in the ZRWA. In the case where an exceptional situation such as sudden power-off (SPO) occurs, information about the written LBA in the ZRWA may be lost, and the reliability of data stored in the ZRWA may not be guaranteed in a subsequent operation. As such, a technique for managing a physical region where data are actually stored through the random write operation in the ZRWA may be required.

Figure 7:
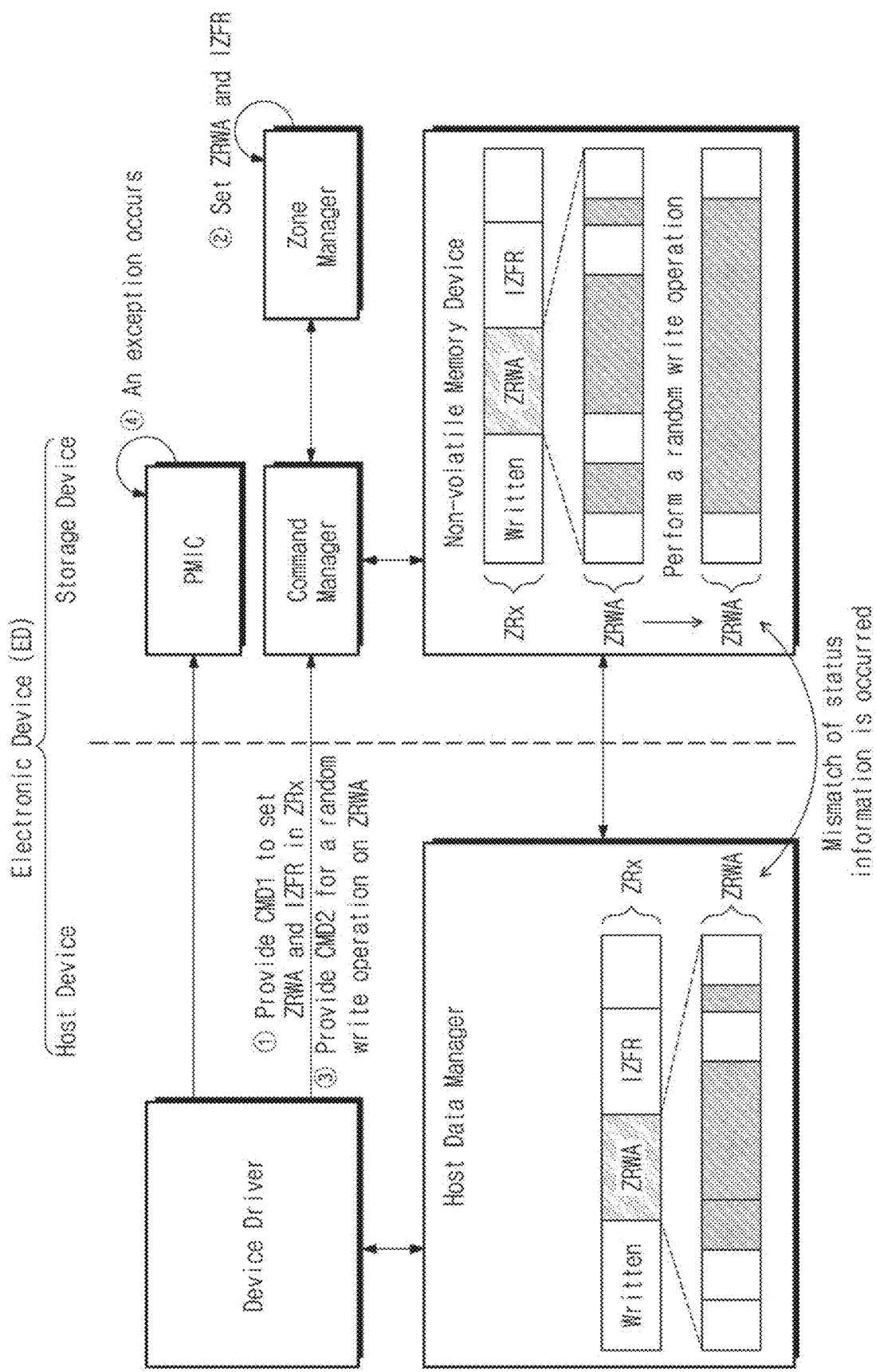
FIG. 7 is a diagram describing a method of operating a related electronic device.

FIG. 7 is a diagram describing a method of operating a related electronic device. Referring to FIG. 7, a related electronic device ED may support the ZNS standard. For better understanding, the related electronic device ED will be described.

The related electronic device ED may include a host device and a storage device. The host device may include a device driver and a host data manager. The device driver may generate a command for managing the storage device. The host data manager may manage a zone region in compliance with the ZNS standard. The host data manager may be implemented as a part of the device driver. For example, the host data manager may manage a target zone region ZRx. The target zone region ZRx may include a written LBA region where data are written, the ZRWA, and the IZFR. Data may be stored randomly (i.e., non-sequentially) in the ZRWA.

The storage device may include a power manager integrated circuit (PMIC), a command manager, a zone manager, and a non-volatile memory device. The PMIC may manage power supply voltages necessary for an internal operation of the storage device, based on a power supply voltage received from the device driver. The command manager may process a command received from the device driver. The zone manager may allocate zone regions to physical blocks of the non-volatile memory device and may manage the allocated zone regions. The non-volatile memory device may include a plurality of physical blocks corresponding to a zone region. For example, the non-volatile memory device may include a plurality of physical blocks allocated to the target zone region ZRx.

Below, a method of operating the related electronic device ED will be described.

In a first operation ①, the device driver may provide the command manager with a first command CMD1 for setting the ZRWA and the IZFR in the target zone region ZRx.

In a second operation ②, the command manager may control the zone manager based on the first command CMD1 such that the ZRWA and the IZFR are set in the target zone region ZRx. The ZRWA and the IZFR may correspond to logical spaces of the target zone region ZRx, in which the random write is exceptionally permitted.

In a third operation ③, the device driver may provide the command manager with a second command CMD2 for the random write operation on the ZRWA in the target zone region ZRx. The command manager may perform the random write operation based on the second command CMD2. Data may be randomly stored in a physical region of the non-volatile memory device, which corresponds to the ZRWA.

In this case, the ZRWA of the host device may not be synchronized with the ZRWA of the storage device. For example, a write pointer of the target zone region ZRx may point out a start LBA of the ZRWA. Even though the random write operation is performed in the ZRWA, the write pointer may not be updated unless the write operation is performed in the IZFR. Also, when the random write operation is performed on the ZRWA, the status information of the ZRWA of the host device (e.g., information of LBAs randomly written in the ZRWA) may be updated non-periodically or may not be updated. Alternatively, even if the host device attempts to recover the status information of the ZRWA through a journal replay operation, it may be difficult to accurately recover the status information of the ZRWA due to a lack of a host memory.

In a fourth operation ④, an exceptional situation may occur. For example, a power supply voltage that is supplied from the device driver to the PMIC may be interrupted. That is, the SPO may occur. Because a separate protocol to update the status information of the ZRWA is not provided between the host device and the storage device, the operation of the related electronic device ED may abnormally end in a state where the status information of the host device and the status information of the storage device are mismatched.

When the power supply is resumed, the host device may perform a subsequent operation. The status information of the ZRWA in the host data manager may be different from the status information of the ZRWA in the storage device. The host data manager may treat a region where data are actually stored on the storage device side, as a region where data are not stored. The host device may attempt the overwriting of data in a subsequent operation. In this case, previously stored data may be lost, or new data may be incapable of being stored. Thus, reliability of data of the storage device is not guaranteed.

Figure 8:
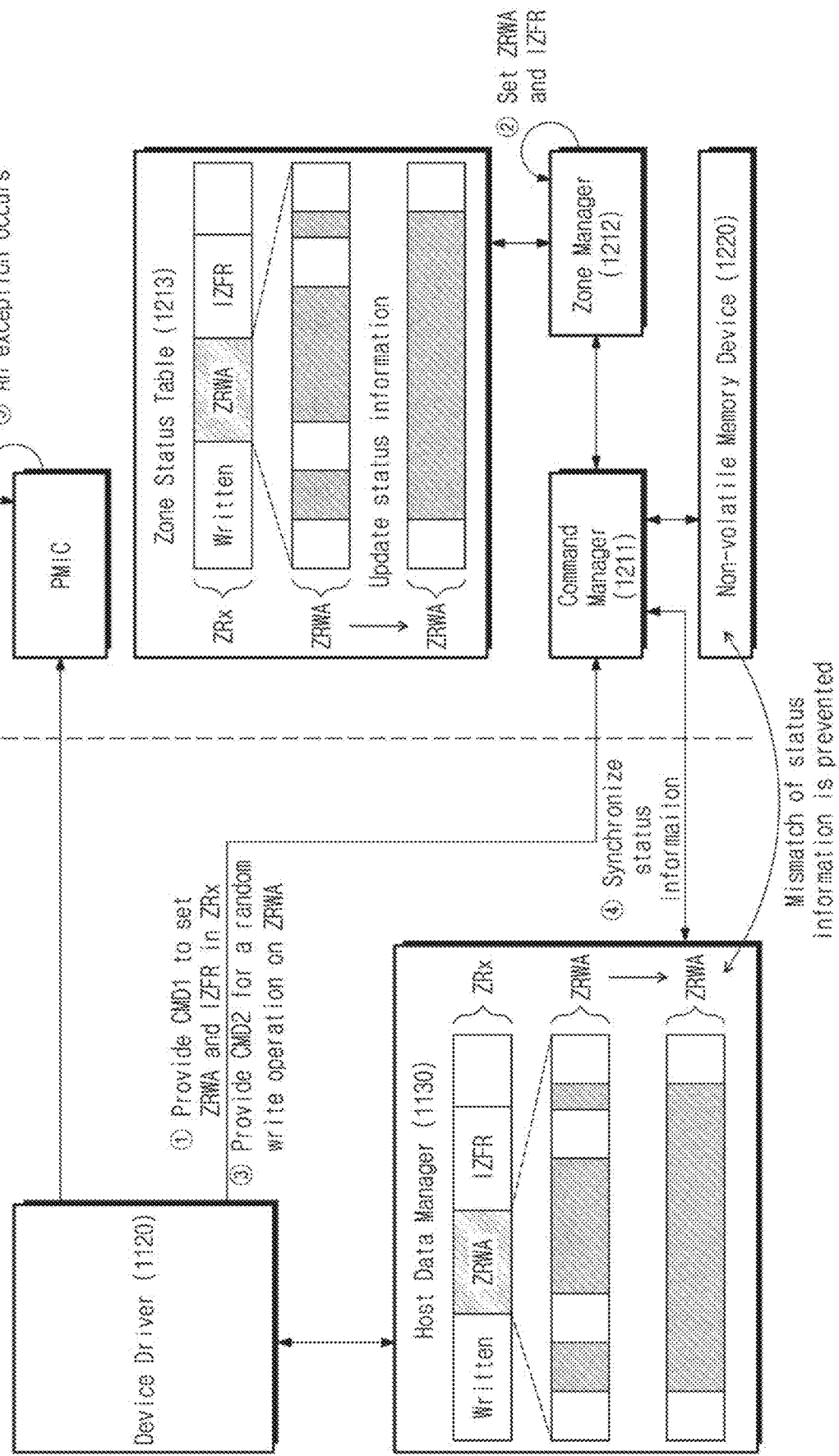
FIG. 8 is a diagram describing a method of operating an electronic device according to some example embodiments.

FIG. 8 is a diagram describing a method of operating an electronic device according to some example embodiments. Referring to FIG. 8, the electronic device 1000 may support the ZNS standard. The electronic device 1000 may include the host device 1100 and the storage device 1200. The host device 1100 may include the device driver 1120 and a host data manager 1130. The device driver 1120 may generate a command for managing the storage device 1200. The host data manager 1130 may manage the target zone region ZRx in compliance with the ZNS standard. The host data manager 1130 may be implemented as a part of the device driver 1120. The target zone region ZRx may include written LBA regions where data are written, the ZRWA, and the IZFR. Data may be stored randomly (i.e., non-sequentially) in the ZRWA.

The storage device 1200 may include a PMIC, the command manager 1211, the zone manager 1212, the zone status table 1213, and the non-volatile memory device 1220. The PMIC may manage power supply voltages necessary for an internal operation of the storage device 1200, based on a power supply voltage received from the device driver 1120. The command manager 1211 may process a command received from the device driver 1120. The zone manager 1212 may allocate a zone region to physical blocks of the non-volatile memory device 1220 and may manage the allocated zone region. The zone status table 1213 may manage status information of the ZRWA of the target zone region ZRx under control of the zone manager 1212. The status information may indicate written LBAs of the ZRWA, at which data are randomly written. The non-volatile memory device 1220 may include a plurality of physical blocks corresponding to a zone region. For example, the non-volatile memory device 1220 may include a plurality of physical blocks allocated to the target zone region ZRx.

Below, the method of operating the electronic device 1000 according to some example embodiments will be described.

In a first operation ①, the device driver 1120 may provide the command manager 1211 with the first command CMD1 for setting the ZRWA and the IZFR in the target zone region ZRx.

In a second operation ②, the command manager 1211 may control the zone manager 1212 based on the first command CMD1 such that the ZRWA and the IZFR are set in the target zone region ZRx. The ZRWA and the IZFR may correspond to logical spaces of the target zone region ZRx, in which the random write is exceptionally permitted.

In a third operation ③, the device driver 1120 may provide the command manager 1211 with the second command CMD2 for the random write operation on the ZRWA in the target zone region ZRx. The command manager 1211 may perform the random write operation based on the second command CMD2. Data may be randomly stored in a physical region of the non-volatile memory device 1220, which corresponds to the ZRWA.

The command manager 1211 may control the zone manager 1212 to update the status information of the ZRWA of the target zone region ZRx, which is included in the zone status table 1213. The updated status information may indicate at least a portion, in which data are stored, of a physical region of the non-volatile memory device 1220 corresponding to the ZRWA of the target zone region ZRx (e.g., physical blocks having PBAs corresponding to LBAs or sub-blocks indicated by corresponding physical page numbers). That is, the status information of the ZRWA in the zone status table 1213 may accurately reflect a region of the non-volatile memory device 1220, in which data are actually stored.

In a fourth operation ④, the status information of the host device 1100 may be synchronized with the status information of the storage device 1200. For example, the device driver 1120 may provide the command manager 1211 with a command for obtaining status information. The command manager 1211 may control the zone manager 1212 to obtain the status information of the zone status table 1213 and may provide the obtained status information to the device driver 1120. The device driver 1120 may update the status information of the host data manager 1130. The status information of the host data manager 1130 may be identical to the status information of the zone status table 1213. Accordingly, the mismatch between the status information of the host device 1100 and the status information of the storage device 1200 may be prevented.

In a fifth operation ⑤, an exceptional situation may occur. For example, a power supply voltage that is supplied from the device driver 1120 to the PMIC may be interrupted. For example, the SPO may occur. Because the status information of the host device 1100 and the status information of the storage device 1200 are synchronized in the fourth operation ④, the operation of the electronic device 1000 may abnormally end in a state where the status information of the host device 1100 and the status information of the storage device 1200 are matched.

When the power supply is resumed, the host device 1100 may perform a subsequent operation. The status information of the ZRWA in the host data manager 1130 may be identical to the status information of the ZRWA in the storage device 1200. Because the host device 1100 performs a subsequent operation based on the synchronized status information of the ZRWA, the overwriting due to the mismatch of the status information of the ZRWA may be suppressed. Accordingly, the event that previously stored data are lost or new data are incapable of being stored may be prevented. This may mean that the reliability of data of the storage device 1200 is improved.

Figure 9:
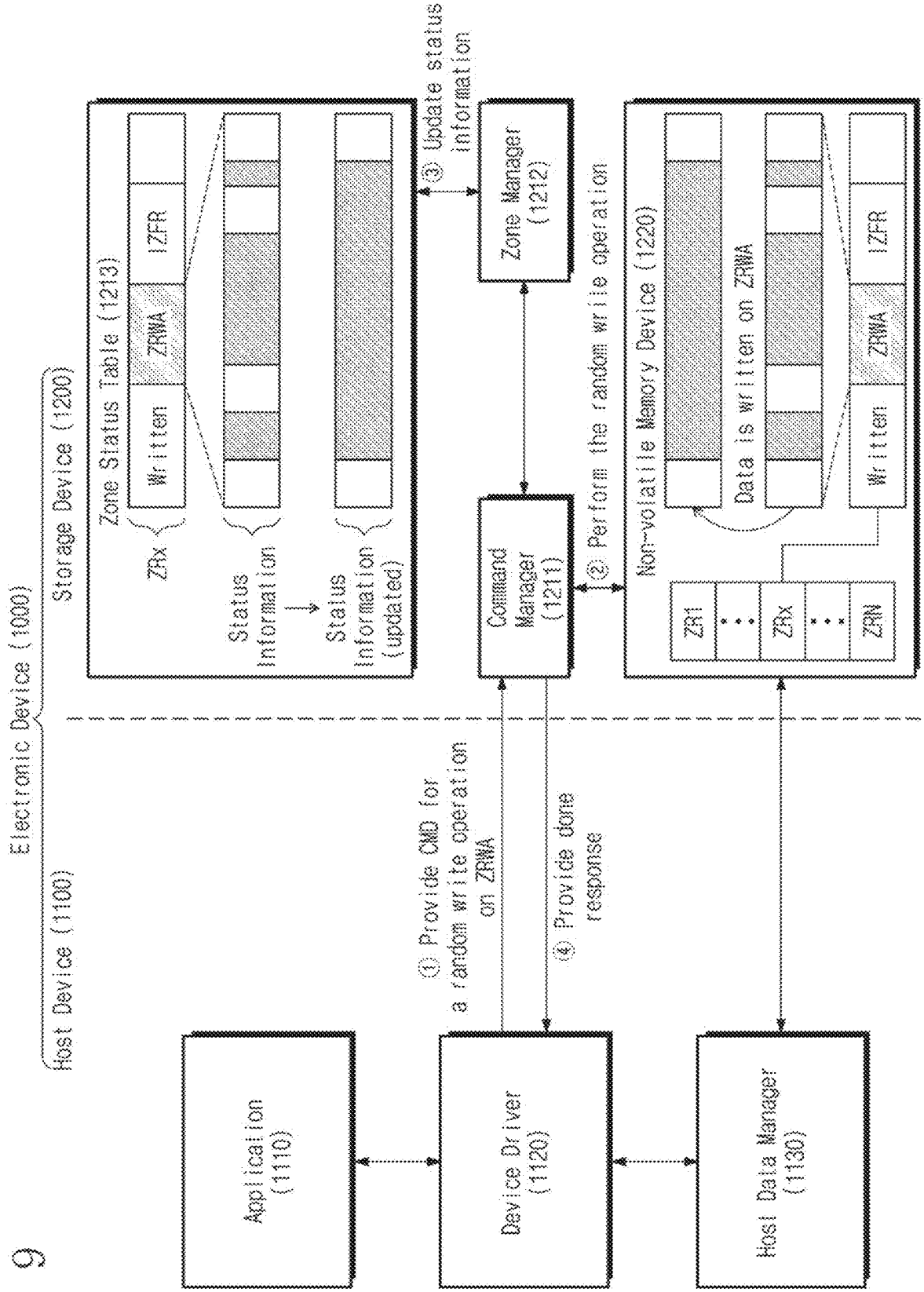
FIG. 9 is a diagram describing a random write operation of an electronic device according to some example embodiments.

FIG. 9 is a diagram describing a random write operation of an electronic device according to some example embodiments. Referring to FIG. 9, the electronic device 1000 may include the host device 1100 and the storage device 1200. The host device 1100 may include the application 1110, the device driver 1120, and the host data manager 1130. The storage device 1200 may include the command manager 1211, the zone manager 1212, the zone status table 1213, and the non-volatile memory device 1220. The application 1110 is similar to the application 1110 of FIG. 1, and thus, additional description will be omitted to avoid redundancy. The device driver 1120, the host data manager 1130, the command manager 1211, the zone manager 1212, the zone status table 1213, and the non-volatile memory device 1220 are similar to the device driver 1120, the host data manager 1130, the command manager 1211, the zone manager 1212, the zone status table 1213, and the non-volatile memory device 1220 of FIG. 8, and thus, additional description will be omitted to avoid redundancy.

Below, the random write operation of the electronic device 1000 according to some example embodiments will be described.

In a first operation ①, the application 1110 may provide a system request for the random write operation to the device driver 1120. The device driver 1120 may generate the command CMD for the random write operation of data on the ZRWA of the target zone region ZRx, based on the system request. The device driver 1120 may provide the command CMD for the random write operation to the command manager 1211.

In a second operation ②, the command manager 1211 may perform the random write operation of the data on a physical region of the non-volatile memory device 1220 corresponding to the ZRWA of the target zone region ZRx among the first to N-th zone regions ZR1 to ZRN, based on the command CMD. The data corresponding to the random write operation may be randomly (i.e., non-sequentially) stored in the physical region corresponding to the ZRWA of the target zone region ZRx.

In some example embodiments, the storage device 1200 may store the data based on direct memory access (DMA) communication. For example, the host device 1100 may further include a host memory. The storage device 1200 may further include a volatile memory device that functions as a DMA buffer. The command manager 1211 may control the DMA buffer based on the command CMD such that the DMA buffer receives the data corresponding to the random write operation from the host memory and may randomly store the data of the DMA buffer in the physical region corresponding to the ZRWA of the target zone region ZRx of the non-volatile memory device 1220.

In a third operation ③, the command manager 1211 may update status information of the ZRWA of the target zone region ZRx in the zone status table 1213 after completely performing the random write operation in the second operation. The updated status information may indicate at least a portion, in which the data are stored, of the physical region of the non-volatile memory device 1220 corresponding to the ZRWA.

In some example embodiments, the status information may be implemented as a bitmap type. For example, the status information may include bitmap data corresponding to at least one region of the non-volatile memory device 1220, in which data are stored. The status information of the bitmap type will be described in detail with reference to FIG. 11.

In some example embodiments, the status information may be implemented as an address range type. For example, the status information may include random address range data corresponding to at least one region of the non-volatile memory device 1220, in which data are stored. The status information of the address range type will be described in detail with reference to FIG. 12.

In a fourth operation ④, the command manager 1211 may provide a done response to the device driver 1120 after completing both the random write operation and the update of the status information. For example, the command manager 1211 may write completion according to the NVMe in a completion queue (CQ) of the host memory of the host device 1100. The device driver 1120 may notify the application 1110 that the system request for the random write operation is processed.

Figure 10:
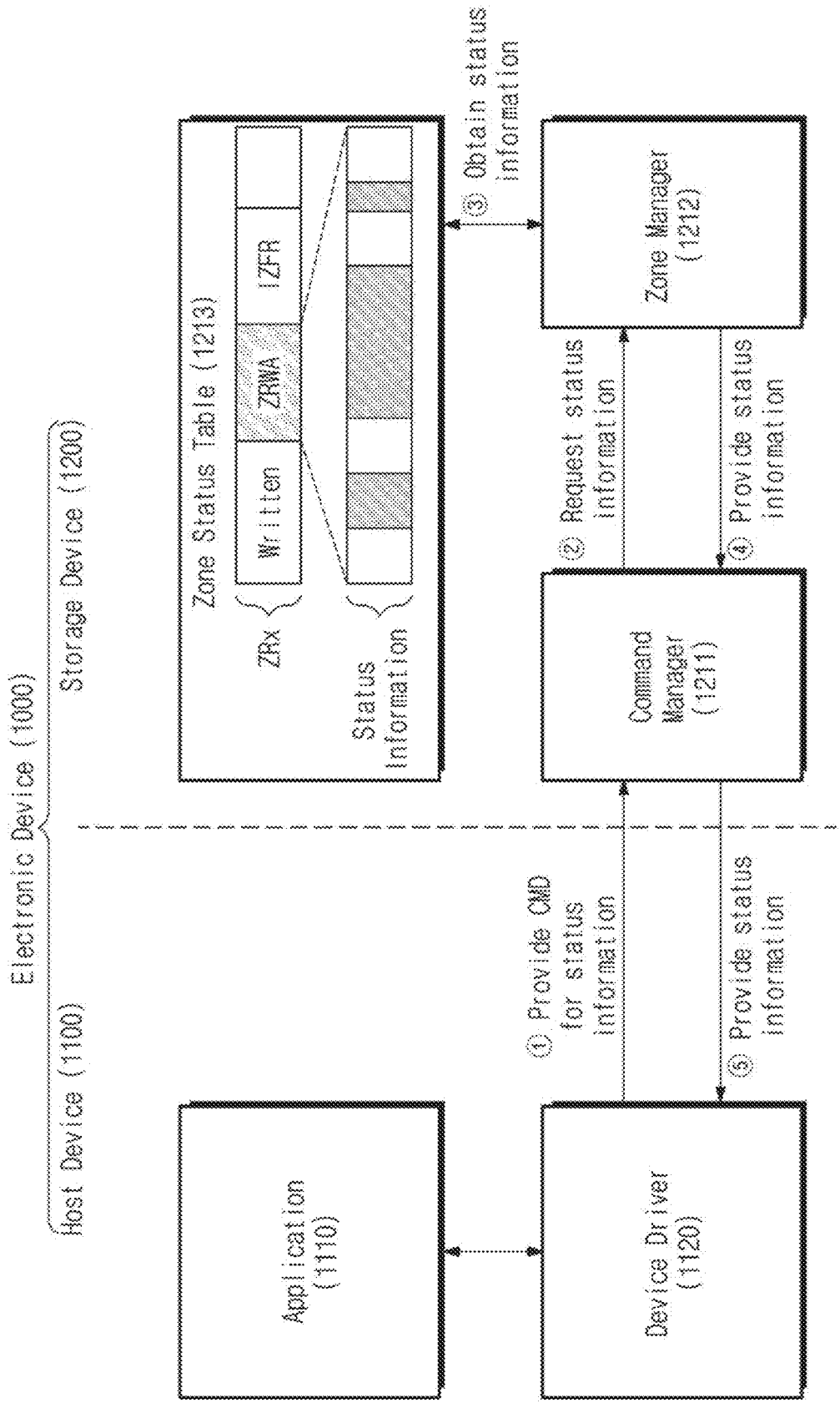
FIG. 10 is a diagram describing a read operation of status information of an electronic device according to some example embodiments.

FIG. 10 is a diagram describing a read operation of status information of an electronic device according to some example embodiments. Referring to FIG. 10, the electronic device 1000 may include the host device 1100 and the storage device 1200. The host device 1100 may include the application 1110 and the device driver 1120. The storage device 1200 may include the command manager 1211, the zone manager 1212, and the zone status table 1213. The application 1110, the device driver 1120, the command manager 1211, the zone manager 1212, and the zone status table 1213 are similar to the application 1110, the device driver 1120, the command manager 1211, the zone manager 1212, and the zone status table 1213 of FIG. 9, and thus, additional description will be omitted to avoid redundancy.

Below, the read operation of the status information of the electronic device 1000 according to some example embodiments will be described.

The application 1110 may provide a system request for reading status information to the device driver 1120. In a first operation ①, the device driver 1120 may generate the command CMD for reading status information of the ZRWA of the target zone region ZRx, based on the system request. The device driver 1120 may provide the command CMD for reading status information to the command manager 1211.

In a second operation ②, the command manager 1211 may provide a request for obtaining status information to the zone manager 1212, based on the command CMD.

In a third operation ③, the zone manager 1212 may obtain the status information of the ZRWA of the target zone region ZRx from the zone status table 1213, based on the request received from the command manager 1211.

In some example embodiments, the status information may be implemented as a bitmap type. For example, the status information may include bitmap data corresponding to at least one region of the non-volatile memory device 1220, in which data are stored.

In some example embodiments, the status information may be implemented as an address range type. For example, the status information may include random address range data corresponding to at least one region of the non-volatile memory device 1220, in which data are stored.

In a fourth operation ④, the zone manager 1212 may provide the obtained status information to the command manager 1211.

In a fifth operation ⑤, the command manager 1211 may provide the status information to the device driver 1120. For example, the command manager 1211 may provide the device driver 1120 with the status information as read data corresponding to the command CMD in the first operation j. The device driver 1120 may notify the application 1110 that the system request for reading status information is processed.

In some example embodiments, the storage device 1200 may provide the status information to the host device 1100 based on the DMA communication. For example, the host device 1100 may further include a host memory. The storage device 1200 may further include a volatile memory device that functions as a DMA buffer and the zone status table 1213. In a third operation ③, the zone manager 1212 may provide the status information of the zone status table 1213 as read data to the host memory, based on the DMA communication. In a fourth operation ④, the zone manager 1212 may notify the command manager 1211 that the status information is transmitted based on the DMA communication. In a fifth operation ⑤, the command manager 1211 may write completion according to the NVMe in a completion queue (CQ) of the host memory of the host device 1100. The device driver 1120 may notify the application 1110 that the system request for reading status information is processed.

Figure 11:
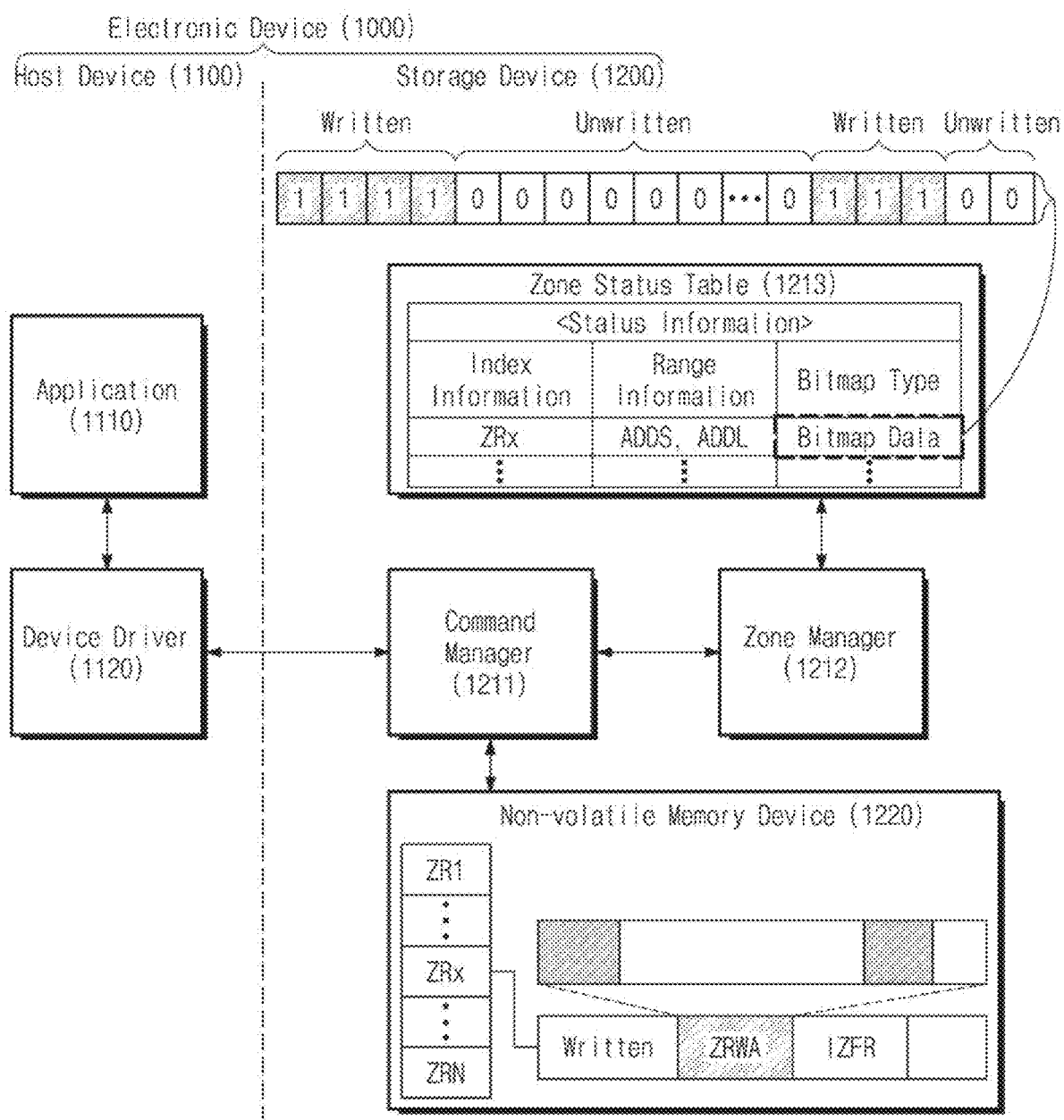
FIG. 11 is a diagram describing status information according to some example embodiments.

FIG. 11 is a diagram describing status information according to some example embodiments. Referring to FIG. 11, the electronic device 1000 may include the host device 1100 and the storage device 1200. The host device 1100 may include the application 1110 and the device driver 1120. The storage device 1200 may include the command manager 1211, the zone manager 1212, the zone status table 1213, and the non-volatile memory device 1220. The application 1110, the device driver 1120, the command manager 1211, the zone manager 1212, the zone status table 1213, and the non-volatile memory device 1220 are similar to the application 1110, the device driver 1120, the command manager 1211, the zone manager 1212, the zone status table 1213, and the non-volatile memory device 1220 of FIG. 9, and thus, additional description will be omitted to avoid redundancy.

The zone status table 1213 may store a plurality of status information corresponding to the first to N-th zone regions ZR1 to ZRN in the non-volatile memory device 1220. For example, the zone status table 1213 may store the status information of the ZRWA of the target zone region ZRx. The status information may be implemented as a bitmap type.

The status information of the bitmap type may include index information of a zone region, range information of the ZRWA, and a set of bitmap data. For example, referring to the status information of the target zone region ZRx, the index information may be used to identify the target zone region ZRx among the first to N-th zone regions ZR1 to ZRN. The range information of the ZRWA may include a start address ADDS and a last address ADDL of the ZRWA in the target zone region ZRx. The bitmap data may indicate at least a portion, in which data are stored, of a physical region of the non-volatile memory device 1220 corresponding to the ZRWA of the target zone region ZRx.

In detail, data in the ZRWA of the target zone region ZRx may correspond to the random write operation and may include a plurality of pieces (i.e., data pieces). The bitmap data may include a series of bits that are respectively associated with physical blocks of the non-volatile memory device 1220. Each of the bits may be set to a first bit value (e.g., "1") when a corresponding physical block of the non-volatile memory device 1220 stores a corresponding piece of data (i.e., when the corresponding physical block is in a written state). Each of the bits may be set to a second bit value (e.g., "0") when a corresponding physical block of the non-volatile memory device 1220 does not store a corresponding piece of data (i.e., when the corresponding physical block is in an unwritten state).

The bitmap data may be updated by the zone manager 1212. For example, the command manager 1211 may perform the random write operation in a physical region of the non-volatile memory device 1220 corresponding to the ZRWA of the target zone region ZRx. The command manager 1211 may control the zone manager 1212 to update the bitmap data in the zone status table 1213.

In detail, when the corresponding physical block of the non-volatile memory device 1220 changes to the written state, the zone manager 1212 may change a bit value of a corresponding bit of the bitmap data in the zone status table 1213 from the second bit value (e.g., "0") to the first bit value (e.g., "1)".

Figure 12:
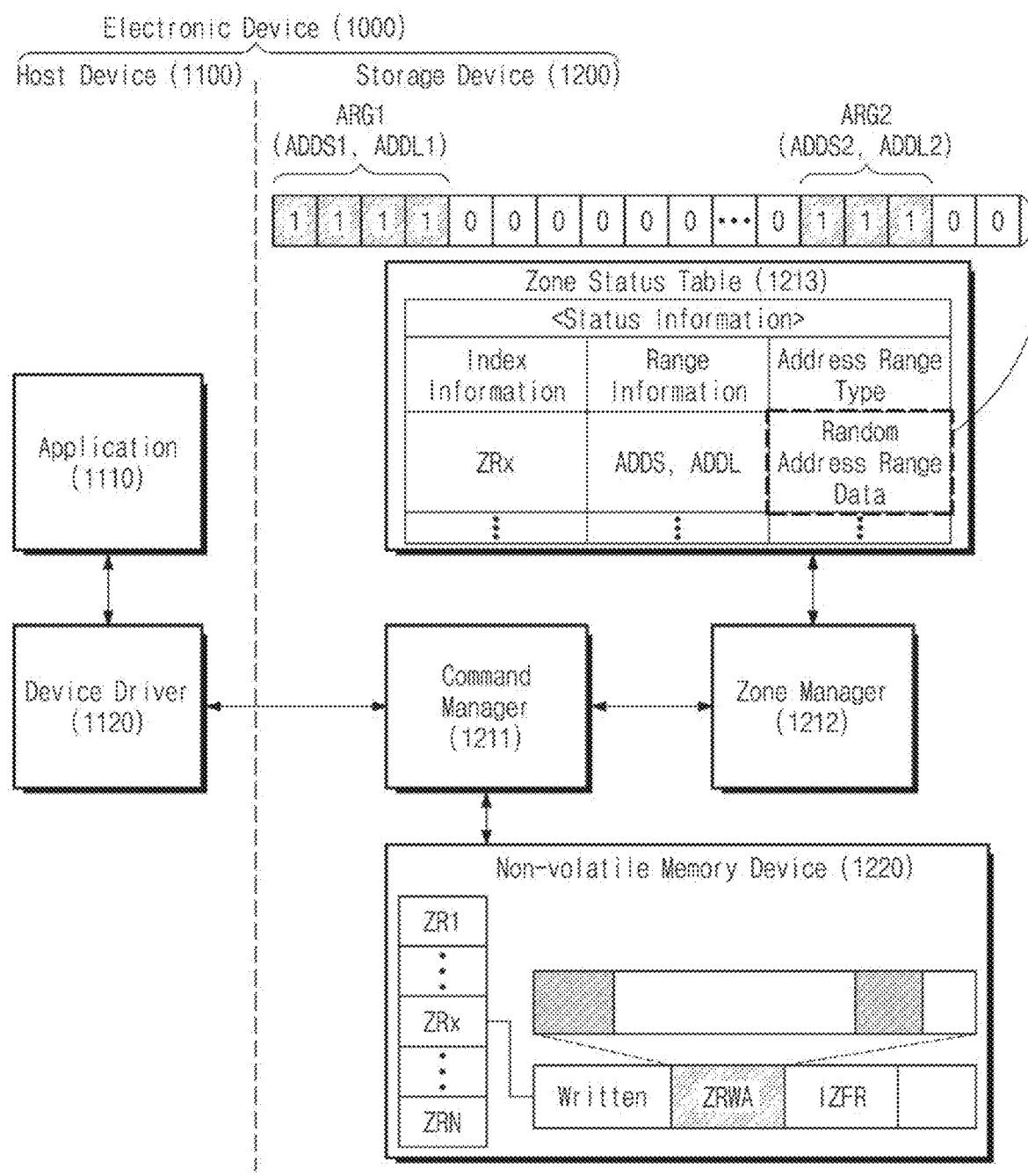
FIG. 12 is a diagram describing status information according to some example embodiments.

FIG. 12 is a diagram describing status information according to some example embodiments. Referring to FIG. 12, the electronic device 1000 may include the host device 1100 and the storage device 1200. The host device 1100 may include the application 1110 and the device driver 1120. The storage device 1200 may include the command manager 1211, the zone manager 1212, the zone status table 1213, and the non-volatile memory device 1220. The application 1110, the device driver 1120, the command manager 1211, the zone manager 1212, the zone status table 1213, and the non-volatile memory device 1220 are similar to the application 1110, the device driver 1120, the command manager 1211, the zone manager 1212, the zone status table 1213, and the non-volatile memory device 1220 of FIG. 9, and thus, additional description will be omitted to avoid redundancy.

The zone status table 1213 may store a plurality of status information corresponding to the first to N-th zone regions ZR1 to ZRN in the non-volatile memory device 1220. For example, the zone status table 1213 may store the status information of the ZRWA of the target zone region ZRx. The status information may be implemented as an address range type.

The status information of the address range type may include index information of a zone region, range information of the ZRWA, and a set of random address range data. For example, referring to the status information of the target zone region ZRx, the index information may be used to identify the target zone region ZRx among the first to N-th zone regions ZR1 to ZRN. The range information of the ZRWA may include the start address ADDS and the last address ADDL of the ZRWA in the target zone region ZRx. The random address range data may indicate at least a portion, in which data are stored, of a physical region of the non-volatile memory device 1220 corresponding to the ZRWA of the target zone region ZRx.

In detail, data in the ZRWA of the target zone region ZRx may correspond to the random write operation and may include a plurality of pieces (i.e., data pieces). The plurality of pieces may include first sequential pieces and second sequential pieces. The first sequential pieces may not be continuous to the second sequential pieces. For example, the last piece of the first sequential pieces may not be continuous to the first piece of the second sequential pieces.

The random address range data may include a first address range ARG1 corresponding to the first pieces of the data, which are sequential. The first address range ARG1 may include a first start address ADDS1 corresponding to the first piece among the first sequential pieces and a first last address ADDL1 corresponding to the last piece among the first pieces of sequential data.

The random address range data may include a second address range ARG2 corresponding to the second pieces of the data, which are sequential. The second address range ARG2 may include a second start address ADDS2 corresponding to the first piece among the second sequential pieces and a second last address ADDL2 corresponding to the last piece among the second sequential pieces.

The random address range data may be updated by the zone manager 1212. For example, the command manager 1211 may perform the random write operation in a physical region of the non-volatile memory device 1220 corresponding to the ZRWA of the target zone region ZRx. The random write operation may include a write operation for the first sequential pieces and a random write operation for the second sequential pieces. The command manager 1211 may control the zone manager 1212 to update the random address range data in the zone status table 1213.

In detail, when physical blocks of the non-volatile memory device 1220 corresponding to the first sequential pieces changes to a written state, the zone manager 1212 may add the first address range ARG1 to the random address range data in the zone status table 1213. When physical blocks of the non-volatile memory device 1220 corresponding to the second sequential pieces change to a written state, the zone manager 1212 may add the second address range ARG2 to the random address range data in the zone status table 1213.

Figure 13:
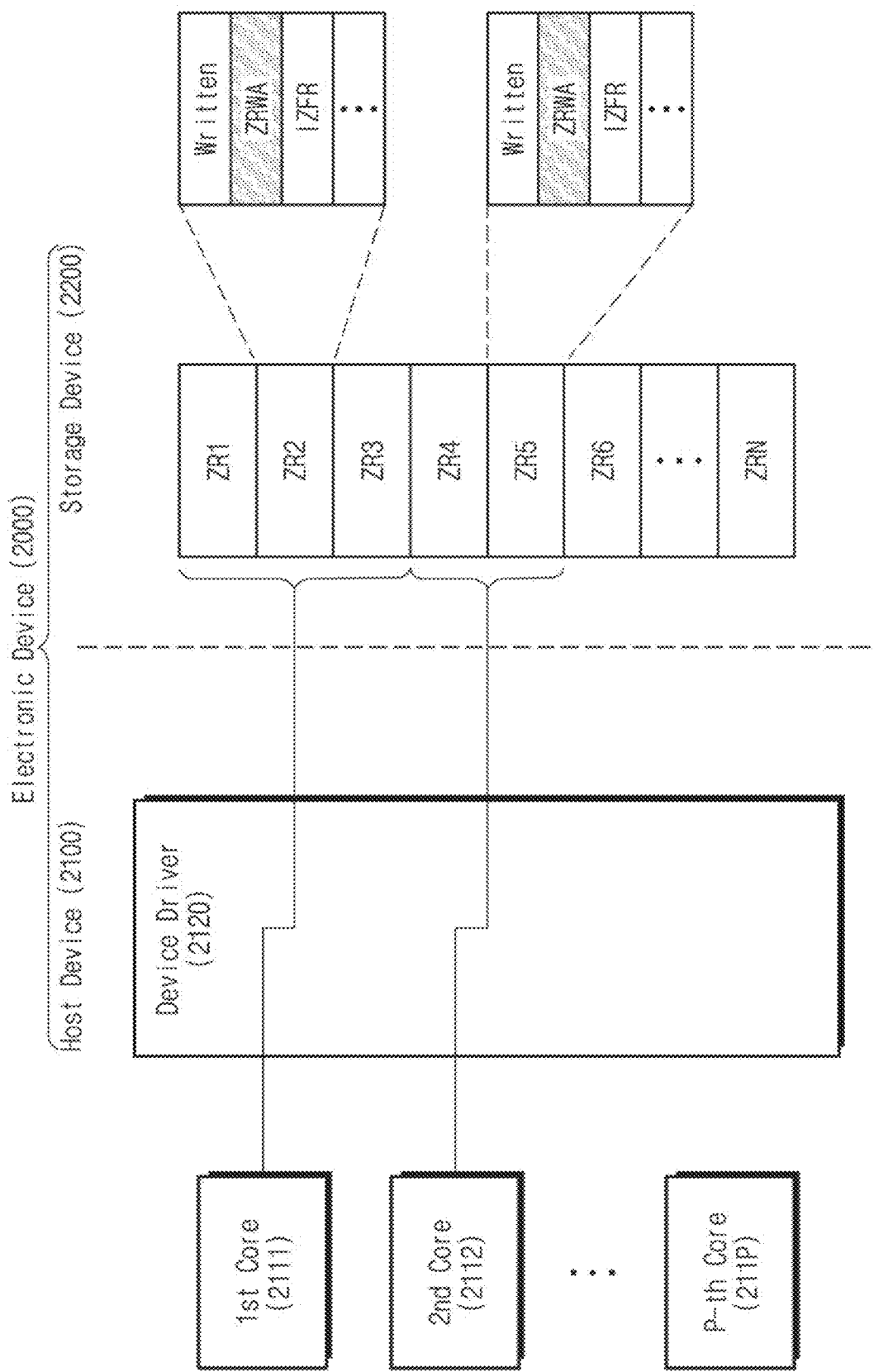
FIG. 13 is a diagram illustrating an electronic device including multiple cores according to some example embodiments.

FIG. 13 is a diagram illustrating an electronic device including multiple cores according to some example embodiments. Referring to FIG. 13, an electronic device 2000 may include a host device 2100 and a storage device 2200. The host device 2100 may include first to P-th cores 2111 to 211P and a device driver 2120. Herein, "P" is an arbitrary natural number. The first to P-th cores 2111 to 211P may be computational cores performing computation such as a logic operation and an arithmetic operation. For example, the first to P-th cores 2111 to 211P may be implemented with a central processing unit (CPU), a graphical processing unit (GPU), a neural processing unit (NPU), etc. The storage device 2200 may include physical regions corresponding to the first to N-th zone regions ZR1 to ZRN.

The electronic device 2000 may allocate at least one dedicated zone region for each of multiple cores. For example, the device driver 2120 may provide the storage device 2200 with a command for allocating the first to third zone regions ZR1 to ZR3 to the first core 2111. The storage device 2200 may allocate the first to third zone regions ZR1 to ZR3 to the first core 2111. The device driver 2120 may provide the storage device 2200 with a command for allocating the fourth and fifth zone regions ZR4 and ZR5 to the second core 2112. The storage device 2200 may allocate the fourth and fifth zone regions ZR4 and ZR5 to the second core 2112. That is, the first core 2111 may manage the first to third zone regions ZR1 to ZR3, and the second core 2112 may manage the fourth and fifth zone regions ZR4 and ZR5.

The electronic device 2000 may support the random write operation of the ZRWA in compliance with the ZNS standard for a multi-core.

For example, the first core 2111 may provide a first command for setting the ZRWA and the IZFR in the second zone region ZR2 to the storage device 2200 through the device driver 2120. The storage device 2200 may set the ZRWA and the IZFR in the second zone region ZR2, based on the first command.

The first core 2111 may provide a second command for the random write operation of first data to the storage device 2200. The storage device 2200 may perform the random write operation of the first data on a physical region of a non-volatile memory device of the storage device 2200, which corresponds to the ZRWA of the second zone region ZR2. The storage device 2200 may update status information of the ZRWA of the second zone region ZR2 in a zone status table of the storage device 2200.

The first core 2111 may provide the storage device 2200 with a third command for reading status information of the ZRWA of the second zone region ZR2 in compliance with the ZNS standard. The storage device 2200 may obtain the status information of the ZRWA of the second zone region ZR2 from the zone status table of the storage device 2200, based on the third command. In this case, the status information may indicate at least a portion, in which the first data are stored, of a physical region of the non-volatile memory device of the storage device 2200, which corresponds to the ZRWA of the second zone region ZR2. The storage device 2200 may provide the status information of the ZRWA of the second zone region ZR2 to the first core 2111.

The second core 2112 may provide a fourth command for setting the ZRWA and the IZFR in the fifth zone region ZR5 to the storage device 2200 through the device driver 2120. The storage device 2200 may set the ZRWA and the IZFR in the fifth zone region ZR5, based on the fourth command.

The second core 2112 may provide a fifth command for the random write operation of second data to the storage device 2200. The storage device 2200 may perform the random write operation of the second data on a physical region of the non-volatile memory device of the storage device 2200, which corresponds to the ZRWA of the fifth zone region ZR5. The storage device 2200 may update status information of the ZRWA of the fifth zone region ZR5 in the zone status table of the storage device 2200.

The second core 2112 may provide the storage device 2200 with a sixth command for reading status information of the ZRWA of the fifth zone region ZR5 in compliance with the ZNS standard. The storage device 2200 may obtain the status information of the ZRWA of the fifth zone region ZR5 from the zone status table of the storage device 2200, based on the sixth command. In this case, the status information may indicate at least a portion, in which the second data are stored, of a physical region of the non-volatile memory device of the storage device 2200, which corresponds to the ZRWA of the fifth zone region ZR5. The storage device 2200 may provide the status information of the ZRWA of the fifth zone region ZR5 to the second core 2112.

Operations of multiple cores may be independent of each other. For example, the first to third commands may be processed (or executed) before the fourth to sixth commands, the fourth to sixth commands may be processed (or executed) before the first to third commands, or the first to third commands and the fourth to sixth commands may be processed (or executed) alternately.

Figure 14:
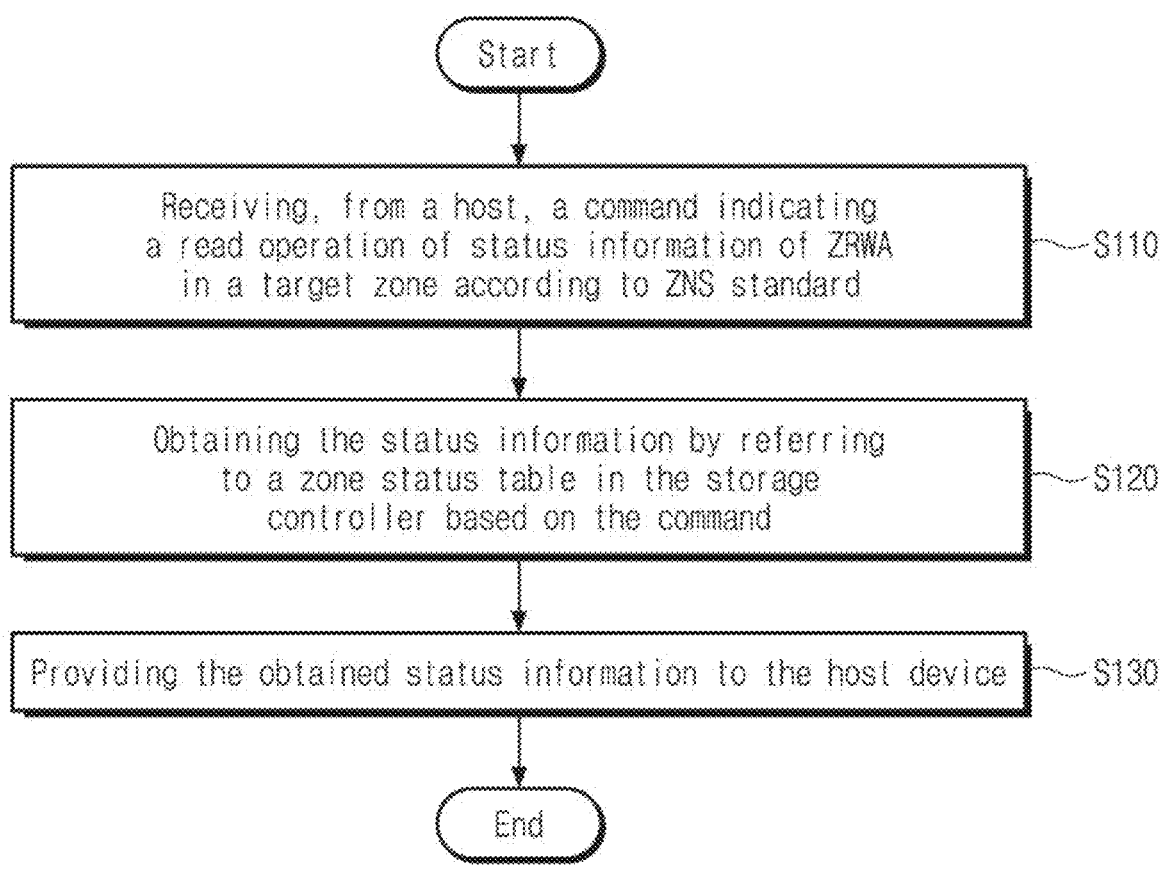
FIG. 14 is a flowchart describing a method of operating a storage controller according to some example embodiments.

FIG. 14 is a flowchart describing a method of operating a storage controller according to some example embodiments. Referring to FIG. 14, a storage controller may communicate with a host device and a non-volatile memory device. The storage controller and the non-volatile memory device may be collectively referred to as a "storage device".

In operation S110, the storage controller may receive, from the host device, a command indicating the read operation of status information of the ZRWA of a target zone region in compliance with the ZNS standard. The target zone region may support the sequential write. The ZRWA of the target zone region may support the random write exceptionally.

The target zone region may include a region where data are sequentially written, the ZRWA, and the IZFR. A write pointer of the target zone region may indicate a start address (e.g., a start LBA) of the ZRWA. The target zone region may have the ZSIO state, the ZSEO state, or the ZSC state of the ZNS standard.

In operation S120, the storage controller may obtain status information from a zone status table in the storage controller, based on the command in operation S110. The status information may indicate at least a portion, in which data are stored, of the physical region of the non-volatile memory device, which corresponds to the ZRWA of the target zone region.

In some example embodiments, the status information may be implemented as a bitmap type. For example, the status information may include index information of a target zone region, range information of the ZRWA, and a set of bitmap data. The bitmap data may correspond to at least a portion, in which data are stored, of the physical region corresponding to the ZRWA of the target zone region. The bitmap data may include a series of bits respectively associated with physical blocks of the non-volatile memory device. Each of the bits may be set to a first bit value when a corresponding physical block in the non-volatile memory device stores a corresponding piece of data and may be set to a second bit value when a corresponding physical block in the non-volatile memory device does not store a corresponding piece of data.

In some example embodiments, the status information may be implemented as an address range type. For example, the status information may include index information of a target zone region, range information of the ZRWA, and a set of random address range data. The random address range data may correspond to at least a portion, in which data are stored, of the physical region corresponding to the ZRWA of the target zone region. Data may include first sequential pieces and second sequential pieces. The first sequential pieces may not be continuous to the second sequential pieces. The random address range data may include a first address range corresponding to the first sequential pieces of the data and a second address range corresponding to the second sequential pieces of the data.

In operation S130, the storage controller may provide the status information obtained in operation S120 to the host device. Accordingly, the status information of the ZRWA of the host device and the status information of the ZRWA of the storage device may be synchronized.

Figure 15:
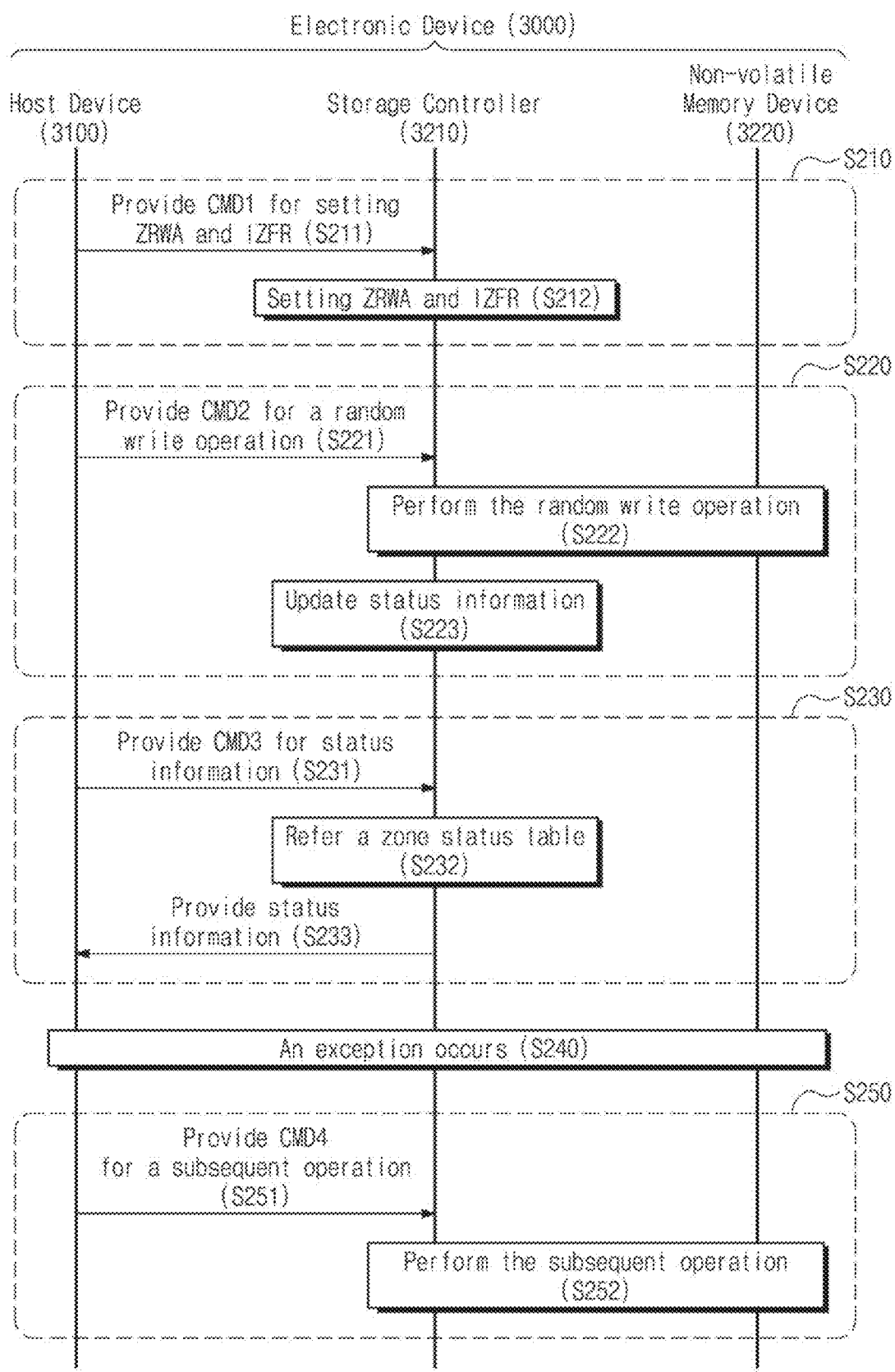
FIG. 15 is a flowchart describing a method of operating an electronic device according to some example embodiments.

FIG. 15 is a flowchart describing a method of operating an electronic device according to some example embodiments. An electronic device 3000 may include a host device 3100, a storage controller 3210, and a non-volatile memory device 3220. The storage controller 3210 and the non-volatile memory device 3220 may be collectively referred to as a "storage device".

In operation S210, the electronic device 3000 may set the ZRWA and the IZFR of a target zone region. Operation S210 may include operation S211 and operation S212. In operation S211, the host device 3100 may provide the storage controller 3210 with the first command CMD1 for setting the ZRWA and the IZFR of the target zone region. In operation S212, the storage controller 3210 may set the ZRWA and the IZFR of the target zone region.

In operation S220, the electronic device 3000 may perform the random write operation. Operation S220 may include operation S221, operation S222, and operation S223. In operation S221, the host device 3100 may provide the storage controller 3210 with the second command CMD2 for the random write operation of target data in the ZRWA of the target zone region. In operation S222, the storage controller 3210 and the non-volatile memory device 3220 may perform the random write operation (i.e., may store the target data in the ZRWA of the target zone region). In operation S223, the storage controller 3210 may update status information of the ZRWA of the target zone region in a zone status table of the storage controller 3210. The status information may indicate at least a portion, in which data are stored through the random write operation, of a physical region of the non-volatile memory device 3220, which corresponds to the ZRWA of the target zone region.

In operation S230, the electronic device 3000 may perform the read operation of the status information of the ZRWA. Operation S230 may include operation S231, operation S232, and operation S233. In operation S231, the host device 3100 may provide the storage controller 3210 with a third command CMD3 for reading the status information of the ZRWA of the target zone region. In operation S232, the storage controller 3210 may obtain the status information of the ZRWA of the target zone region from the zone status table of the storage controller 3210. In operation S233, the storage controller 3210 may provide the status information of the ZRWA of the target zone region to the host device 3100.

In operation S240, an exceptional situation may occur. For example, the power supply from the host device 3100 to the storage controller 3210 may be interrupted. That is, the SPO event may occur in the electronic device 3000. When power supply is resumed, the electronic device 3000 may perform operation S250.

In operation S250, the electronic device 3000 may perform a subsequent operation in the ZRWA of the target zone region. Operation S250 may include operation S251 and operation S252. In operation S251, the host device 3100 may determine a subsequent operation based on the status information provided in operation S233. The host device 3100 may provide the storage controller 3210 with a fourth command CMD4 for the subsequent operation in the ZRWA of the target zone region. In operation S252, the storage controller 3210 and the non-volatile memory device 3220 may perform the subsequent operation in the ZRWA of the target zone region.

In some example embodiments, the subsequent operation data may be the read operation. For example, the fourth command CMD4 may indicate the operation of reading the data stored through the random write operation from the physical region corresponding to the ZRWA of the target zone region. Because the status information of the ZRWA in the host device 3100 is synchronized based on the status information received in operation S233, it may be possible to accurately access data randomly stored in the ZRWA.

In some example embodiments, the subsequent operation may be the random write operation. For example, the fourth command CMD4 may indicate the random write operation of subsequent target data on the remaining regions other than the regions where the target data are stored through the random write operation in operation S222, with regard to the physical region corresponding to the ZRWA of the target zone region. Because the status information of the ZRWA in the host device 3100 is synchronized based on the status information received in operation S233, the overwriting and the loss of data due to the overwriting may be suppressed in a subsequent random write operation of the ZRWA, and the reliability of data written through the random write operation may be improved.

According to an example embodiment, a storage controller providing status information of a zone region, a method of operating the storage controller, and a method of operating an electronic device including the storage controller are provided.

Also, a storage controller that manages status information about a random write operation of a zone random write area (ZRWA) such that data mismatch between a host side and a storage side is suppressed and the reliability of data is improved when a sudden power-off (SPO) event occurs, a method of operating the storage controller, and a method of operating an electronic device including the storage controller are provided.

While aspects of example embodiments have been described, it will be apparent to those of ordinary skill in the art that various changes and modifications may be made thereto without departing from the spirit and scope of the following claims.

What is claimed is:

1. A method of operating a storage controller which communicates with a host device and a non-volatile memory device, the method comprising:
   receiving a first command from the host device indicating a read operation of first status information of a first zone random write area (ZRWA) in a first zone region, wherein the first command complies with a zoned namespace (ZNS) standard;
   obtaining the first status information from a zone status table in the storage controller based on the first command, wherein the first status information indicates at least a portion of a first physical region of the non-volatile memory device corresponding to the first ZRWA in which first data are stored; and
   providing the first status information to the host device.

2. The method of claim 1, wherein the first zone region supports a sequential write operation and a random write operation.

3. The method of claim 1, wherein the first zone region includes a sequentially written region, the first ZRWA, and an implicit ZRWA flush region (IZFR),
   wherein a write pointer of the first zone region points to a start logical block address (LBA) of the first ZRWA, and
   wherein the first zone region has a ZSIO state, a ZSEO state, or a ZSC state which complies with the ZNS standard.

4. The method of claim 1, further comprising:
   before receiving the first command, receiving a second command from the host device indicating a random write operation of the first data;
   performing the random write operation of the first data on the first physical region of the non-volatile memory device, based on the second command; and
   updating the first status information of the zone status table based on the random write operation of the first data.

5. The method of claim 4, further comprising:
   before receiving the second command, receiving a third command from the host device for setting the first ZRWA in the first zone region; and
   setting the first ZRWA in the first zone region, based on the third command.

6. The method of claim 1, wherein the host device includes a first core managing the first zone region and a second core managing a second zone region, and
   wherein the method further comprises:
      receiving a fourth command from the second core of the host device indicating a read operation of second status information of a second ZRWA in the second zone region, wherein the fourth command complies with the ZNS standard;
      obtaining the second status information from the zone status table based on the fourth command, wherein the second status information indicates at least a portion of a second physical region of the non-volatile memory device corresponding to the second ZRWA in which second data are stored; and
      providing the second status information to the second core of the host device.

7. The method of claim 6, further comprising:
   before receiving the fourth command, receiving a fifth command from the second core of the host device indicating a random write operation of the second data;
   performing the random write operation of the second data on the second physical region of the non-volatile memory device, based on the fifth command; and
   updating the first status information of the zone status table based on the random write operation of the second data.

8. The method of claim 7, further comprising:
   before receiving the fifth command, receiving a sixth command from the second core of the host device for setting the second ZRWA in the second zone region; and
   setting the second ZRWA in the second zone region, based on the sixth command.

9. The method of claim 1, wherein the first status information includes bitmap data indicating the portion of the first physical region where the first data are stored, and
   wherein each of a series of bits of the bitmap data is set to:
      a first bit value to indicate a corresponding physical block of the non-volatile memory device stores a piece of the first data; or
      a second bit value to indicate the corresponding physical block of the non-volatile memory device does not store a piece of the first data.

10. The method of claim 9, wherein the first status information of the zone status table includes index information of the first zone region, range information of the first ZRWA, and a set of the bitmap data.

11. The method of claim 1, wherein the first status information includes random address range data indicating the portion of the first physical region where the first data are stored,
wherein the random address range data includes:
a first address range corresponding to first sequential pieces of the first data; and
a second address range corresponding to second sequential pieces of the first data, and
wherein the first sequential pieces are not continuous to the second sequential pieces.

12. The method of claim 11, wherein the first status information of the zone status table includes index information of the first zone region, range information of the first ZRWA, and a set of the random address range data.

13. The method of claim 1, further comprising:
after providing the first status information to the host device, based on a power supply from the host device being interrupted and then resumed, receiving a seventh command from the host device indicating a subsequent operation based on the first status information; and
performing the subsequent operation, based on the seventh command.

14. The method of claim 13, wherein the subsequent operation comprises a read operation of the first data stored in the first physical region corresponding to the first ZRWA.

15. The method of claim 13, wherein the subsequent operation comprises a random write operation of third data on remaining regions of the first physical region other than regions where the first data are stored.

16. A method of operating an electronic device which includes a host device, a storage controller, and a non-volatile memory device, the method comprising:
providing, by the host device, a first command to the storage controller, wherein the first command indicates a read operation of status information of a zone random write area (ZRWA) in a target zone region, and complies with a zoned namespace (ZNS) standard;
obtaining, by the storage controller, the status information from a zone status table in the storage controller based on the first command, wherein the status information indicates at least a portion of a physical region of the non-volatile memory device corresponding to the ZRWA in which data are stored; and
providing, by the storage controller, the status information to the host device.

17. The method of claim 16, further comprising:
providing, by the host device, a second command to the storage controller, wherein the second command is for setting the ZRWA in the target zone region;
setting, by the storage controller, the ZRWA in the target zone region, based on the second command;
providing, by the host device, a third command to the storage controller, wherein the third command indicates a random write operation of the data;
performing, by the storage controller, the random write operation of the data on the physical region of the non-volatile memory device, based on the third command; and
updating the status information of the zone status table based on the random write operation of the data.

18. A storage controller comprising:
at least one processor configured to control:
a zone manager to manage a plurality of zone regions in a non-volatile memory device;
status information of a target zone region among the plurality of zone regions to be stored in a zone status table; and
a command manager to:
receive a first command from a host device indicating a read operation of status information of a zone random write area (ZRWA) in the target zone region, wherein the first command complies with a zoned namespace (ZNS) standard;
obtain the status information from the zone status table by controlling the zone manager based on the first command; and
provide the status information to the host device,
wherein the status information indicates a portion of a physical region of the non-volatile memory device corresponding to the ZRWA in which data are stored.

19. The storage controller of claim 18, wherein the at least one processor is further configured to control the command manager to:
receive a second command from the host device for setting the ZRWA in the target zone region, before receiving the first command;
set the ZRWA in the target zone region, based on the second command;
receive a third command from the host device indicating a random write operation of the data, before receiving the first command;
perform the random write operation of the data on the physical region of the non-volatile memory device, based on the third command; and
update the status information of the zone status table based on the random write operation of the data.

20. The storage controller of claim 18, wherein the status information of the zone status table includes:
a first set of index information of the target zone region, range information of the ZRWA, and bitmap data indicating the portion where the data are stored; or
a second set of index information of the target zone region, range information of the ZRWA, and random address range data indicating the portion where the data are stored.

* * * * *